(12) United States Patent
Hu et al.

(10) Patent No.: US 11,204,480 B2
(45) Date of Patent: Dec. 21, 2021

(54) OPTICAL MEMBER DRIVING MECHANISM

(71) Applicant: TDK TAIWAN CORP., Taoyuan (TW)

(72) Inventors: Chao-Chang Hu, Taoyuan (TW);
Liang-Ting Ho, Taoyuan (TW);
Shao-Chung Chang, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 262 days.

(21) Appl. No.: 16/408,932

(22) Filed: May 10, 2019

(65) Prior Publication Data

US 2019/0346654 A1 Nov. 14, 2019

Related U.S. Application Data

(60) Provisional application No. 62/677,753, filed on May 30, 2018, provisional application No. 62/670,580, filed on May 11, 2018.

(51) Int. Cl.
*G02B 7/09* (2021.01)
*G03B 13/36* (2021.01)
*H02K 11/21* (2016.01)
*H02K 5/24* (2006.01)
*H02K 41/035* (2006.01)

(52) U.S. Cl.
CPC ............... *G02B 7/09* (2013.01); *G03B 13/36* (2013.01); *H02K 5/24* (2013.01); *H02K 11/21* (2016.01); *H02K 41/0356* (2013.01); *H02K 41/0354* (2013.01)

(58) Field of Classification Search
CPC . G02B 7/09; G02B 7/08; G03B 13/36; G03B 3/10; H02K 41/0354
See application file for complete search history.

(56) References Cited

U.S. PATENT DOCUMENTS

2016/0025951 A1\* 1/2016 Park ........................ G02B 7/08
359/824

FOREIGN PATENT DOCUMENTS

| CN | 103581557 A | 2/2014 |
| CN | 105301733 A | 2/2016 |

\* cited by examiner

*Primary Examiner* — Cara E Rakowski
(74) *Attorney, Agent, or Firm* — Muncy, Geissler, Olds & Lowe, P.C.

(57) ABSTRACT

An optical member driving mechanism is provided. The optical member driving mechanism includes a fixed portion, a movable portion, and a driving assembly. The fixed portion includes a housing, a frame, a circuit component, and a base. The housing includes a top wall and a plurality of sidewalls, forming a first containing space. The frame is disposed in the first containing space, and has a second containing space. The circuit component is disposed in the frame. The base is connected to the housing. The movable portion is movably connected to the fixed portion, and carries an optical member. The top wall is perpendicular to an optical axis. The sidewalls extend from the top wall along the optical axis. The driving assembly drives the movable portion to move relative to the fixed portion, is electrically connected to the circuit component and partially disposed in the second containing space.

16 Claims, 34 Drawing Sheets

OPTICAL MEMBER DRIVING MECHANISM

CROSS REFERENCE TO RELATED APPLICATIONS

This application claims the benefit of U.S. Provisional Application No. 62/670,580, filed May 11, 2018, and U.S. Provisional Application No. 62/677,753, filed May 30, 2018, the entirety of which are incorporated by reference herein.

BACKGROUND

Technical Field

The disclosure relates to an optical member driving mechanism, and in particular to an optical member driving mechanism including a frame where a circuit component is disposed.

Description of the Related Art

With the development of technology, many electronic devices (such as smartphones and digital cameras) nowadays perform a camera or video function. The usage of these electronic devices has become increasingly widespread, and the electronic devices have been designed for convenience and miniaturization to provide more choices for users.

The electronic devices with a camera or video function usually have a lens driving module disposed therein to drive a lens to move along an optical axis. Therefore, an autofocus (AF) function is achieved. Light may pass through the lens and form an image on a photosensitive member. However, the miniaturization of the electronic devices gradually becomes a mainstream of the consuming requirement, and the thickness of the electronic devices usually depends on the thickness of the lens driving module. Therefore, how to reduce the thickness of the lens driving module has become an important topic.

BRIEF SUMMARY

The present disclosure provides an optical member driving mechanism. The optical member driving mechanism includes a fixed portion, a movable portion, and a driving assembly. The fixed portion includes a housing, a frame, a circuit component, and a base. The housing includes a top wall and a plurality of sidewalls, forming a first containing space. The frame is disposed in the first containing space, and has a second containing space. The circuit component is disposed in the frame. The base is connected to the housing. The movable portion is movably connected to the fixed portion, and carries an optical member. The top wall is perpendicular to an optical axis of the optical member. The sidewalls extend from the top wall along the optical axis. The driving assembly drives the movable portion to move relative to the fixed portion, is electrically connected to the circuit component and partially disposed in the second containing space.

In an embodiment, the optical member driving mechanism further includes a first elastic member that is elastically connected to the movable portion and the fixed portion. The frame further includes a first surface and a second surface, and the first surface and the second surface face the top wall. The distance between the first surface and the top wall is shorter than the distance between the second surface and the top wall, and the first elastic member is disposed on the second surface.

In an embodiment, the circuit component is partially exposed from the second surface and electrically connected to the first elastic member. The driving assembly is electrically connected to the circuit component via the first elastic member. The circuit component is connected to the first elastic member by welding or arranging conductive gel. In an embodiment, the housing further includes an insulating structure that is disposed on a surface of the housing, and the surface faces the frame. The top wall of the housing recesses along the optical axis towards the first elastic member corresponds to the connecting point between the first elastic member and the second surface, and abuts the first elastic member.

In an embodiment, the optical member driving mechanism further includes a second elastic member that is elastically connected to the movable portion and the fixed portion. The frame further includes a third surface that faces the base, and the second elastic member is disposed on the third surface. The base is made of metallic materials. The circuit component is partially exposed from the third surface and is electrically connected to the second elastic member, and the driving assembly is electrically connected to the circuit component via the second elastic member. The optical member driving mechanism further includes an insulating layer that is disposed on the base.

In an embodiment, the frame further includes a plurality of protruding portions, and the second containing space is located between the protruding portions. The protruding portions each have a surface facing the movable portion. The optical member driving mechanism further includes a position-sensing assembly, which includes a reference member and a position sensor, wherein the frame is partially located between the reference member and the position sensor. The optical axis is offset from a geometry center of the housing.

In an embodiment, the frame is substantially C-shaped and forms an opening, the frame further includes three rims, and the second containing space is formed by the rims. The movable portion further includes a positioning portion, the movable portion is disposed in the second containing space, and the positioning portion is located in the opening of the frame.

In an embodiment, the housing further includes a plurality of bonding portions disposed on a bottom surface of the housing. The base further includes a plurality of recesses around the base, and when the housing and the base are bonded together, the bonding portions each are bonded to the recesses. The housing and the base are connected by welding or soldering.

The present disclosure provides an optical member driving mechanism. The optical member driving mechanism includes a fixed portion, a movable portion, a first elastic member, and a driving assembly. The fixed portion includes a housing, a frame, a circuit component, and a base. The housing includes a top wall and a plurality of sidewalls, wherein a first containing space is formed by the sidewalls and the top wall. The frame is disposed in the first containing space. The circuit component is disposed in the frame. The base is fixedly connected to the housing. The movable portion is movably connected to the fixed portion and carries an optical member with an optical axis. The top wall is perpendicular to the optical axis. The sidewalls extend from the top wall along the optical axis, and the circuit component extends along the optical axis. The first elastic member is disposed on the frame and electrically connected to the circuit component. The first elastic member has a plate structure, and a thickness direction of the first elastic member is parallel to the optical axis. The driving assembly drives the movable portion to move relative to the fixed portion and is electrically connected to the circuit component. The driving assembly is partially disposed in the second containing space.

In an embodiment, the movable portion further includes a wiring column. The wiring column is disposed on one side of the movable portion and faces the circuit component. In an embodiment, the optical member driving mechanism further includes a second elastic member located between the housing and the frame. The size of the frame is greater than or equal to the size of the second elastic member as viewed in a direction that is perpendicular to the optical axis. As viewed in the optical axis, two sides of the frame at least partially overlap with the second elastic member, and the sides are opposite sides of the frame.

In an embodiment, the movable portion further includes a plurality of stopping portions protruding from the movable portion towards the base, the stopping portions include a first stopping portion and a second stopping portion. The size of the first stopping portion is greater than the size of the second stopping portion, and the distance between the first stopping portion and the base is shorter than the distance between the second stopping portion and the base. The first stopping portion and the second stopping portion are located on different sides of the movable portion.

In an embodiment, the optical member driving mechanism further includes an insulating layer disposed on a surface of the base, wherein the surface faces the first elastic member. The movable portion further includes a plurality of stopping portions protruding from the movable portion towards the base. As viewed in the optical axis, the stopping portions and the insulating layer do not overlap. In an embodiment, the optical member driving mechanism further includes a second elastic member located between the housing and the frame. The frame further includes a plurality of positioning columns, and the second elastic member is connected to the frame via the positioning columns. The housing has a plurality of holes, and the positioning columns each are disposed in the holes.

In an embodiment, the optical member driving mechanism further includes a second elastic member located between the housing and the frame. As viewed along the optical axis, the second elastic member and the driving assembly at least partially overlap on one side of the frame, the frame further includes a protruding portion located on another side of the frame, and the top surface of the protruding portion is level with the top surface of the second elastic member.

In an embodiment, the frame further includes a protruding column and a hole located on a surface of the frame, the surface faces the base, and the first elastic member is connected to the frame via the protruding column and the hole. The driving assembly further includes two driving coils and a connecting wire connected to the driving coils, the connecting wire and the circuit component at least partially overlap as viewed in a direction that is perpendicular to the optical axis, and the connecting wire and the circuit component are located on opposite sides of the movable portion.

In an embodiment, the frame further includes a plurality of positioning structure abutting the driving assembly, and the driving assembly is located between the positioning structure and the housing.

The present disclosure provides an optical member driving mechanism. The optical element driving mechanism includes a fixed portion, a movable portion, a driving assembly, a first circuit assembly, and a second circuit assembly. The fixed portion includes a housing, a frame, and a base. The frame is affixed to the housing. The base is fixedly connected to the housing. The movable portion is movably connected to the fixed portion, and carries an optical element, wherein the optical element has an optical axis. The driving assembly drives the movable portion to move relative to the fixed portion. The first circuit assembly is disposed in the frame, and electrically connected to the driving assembly. The second circuit assembly is disposed on the base.

In an embodiment, the optical member driving mechanism further includes a position-sensing assembly, which detects the movement of the movable portion relative to the fixed portion. The second circuit assembly is electrically connected to the position-sensing assembly. In an embodiment, the housing, the frame, and the base are sequentially arranged along the optical axis.

In an embodiment, the frame has a plurality of protruding portions extending towards the base. The optical member driving mechanism further includes a damping material that is disposed between the protruding portions and the movable portion. In an embodiment, the driving assembly drives the movable portion to move along the optical axis.

In an embodiment, the first circuit assembly includes a first electrical contact and a second electrical contact, both of which are located on a plane of the frame. The first circuit assembly has a stereoscopic structure and distributes on a plurality of planes. The second circuit assembly has a stereoscopic structure and distributes on a plurality of planes.

In an embodiment, the first circuit assembly and the second circuit assembly partially overlap as viewed in a direction that is perpendicular to the optical axis. The first circuit assembly is electrically connected to the second circuit assembly. In an embodiment, the optical member driving mechanism further includes an elastic member that is disposed between the housing and the frame. The elastic member is electrically connected to the driving assembly and the first circuit assembly.

The present disclosure provides an optical member driving mechanism. The optical element driving mechanism includes a fixed portion, a movable portion, a driving assembly, a first circuit assembly, and a second circuit assembly. The fixed portion includes a housing, a frame, and a base. The frame is affixed to the housing. The base is fixedly connected to the housing. The movable portion is movably connected to the fixed portion, and carries an optical element.

The present disclosure provides an optical member driving mechanism. The optical element driving mechanism has a main axis, and includes a fixed portion, a movable portion, and a driving assembly. The fixed portion includes a housing, a base, and a frame. The base is fixedly connected to the housing along the main axis. The frame is disposed in the housing, and has a plurality of protruding columns extending along the main axis. The protruding columns have a first section and a second section, and the first section is closer to the base than the second section. The movable portion is movable relative to the fixed portion, and carries an optical element. The shortest distance between the first section and the movable portion is longer than the shortest distance between the second section and the movable portion. The driving assembly drives the movable portion to move relative to the fixed portion.

In an embodiment, the optical member driving mechanism further includes a circuit component disposed on one side of the frame, wherein the circuit component extends along the main axis. As viewed in the main axis, the housing is aligned with the base on the side, and the housing is not aligned with the base on another side of the frame. As viewed in a direction that is perpendicular to the main axis, the housing and the base do not overlap. A step is formed by the housing and the base.

In an embodiment, the frame includes a protruding portion, and a hole is formed by the protruding portion and the circuit component. The optical member driving mechanism further includes an elastic member that is connected to the movable portion and the frame. The elastic member includes a first electrical contact, which extends into the hole. In an embodiment, the elastic member further includes a second electrical contact that is electrically connected to the driving assembly, and the extending direction of the first electrical contact is different from the extending direction of the second electrical contact.

In an embodiment, the optical member driving mechanism further includes a circuit component disposed on one side of the frame. The base includes a barrier that extends away from the housing. The barrier abuts the circuit component in a first direction, and the first direction is perpendicular to the main axis. A gap is formed between the barrier and the base in a second direction, and the second direction is perpendicular to the main axis and the first direction.

In an embodiment, the housing has a first magnetic permeability, the base has a second magnetic permeability, and the first magnetic permeability is different from the second magnetic permeability. In an embodiment, the optical member driving mechanism further includes a reference member that is disposed in the movable portion, wherein the movable portion includes a first stopping portion. The first stopping portion protrudes towards the base, and the reference member and the first stopping portion overlap as viewed in the main axis.

In an embodiment, the optical member driving mechanism further includes an elastic member that is connected to the movable portion and the frame. The movable portion further includes a second stopping portion that protrudes towards the base, and the distance between the second stopping portion and the base is shorter than the distance between the elastic member and the base. The optical member driving mechanism further includes at least one damping material that is disposed between the movable portion and the protruding columns.

In an embodiment, the driving assembly includes a magnetic member that is disposed in the frame. The frame includes a positioning portion that is located between the magnetic member and the housing. In an embodiment, a groove is formed between the frame and the magnetic member. The groove is located on a connecting line of two of the protruding columns, and the two protruding columns are adjacent to one another.

In an embodiment, the movable portion further includes at least one side stopping portion that is formed at a corner of the movable portion. The side stopping portion faces the frame in a direction that is perpendicular to the main axis. The housing further includes a first surface and a second surface, wherein the first surface is closer to the base than the second surface, and the first surface and the protruding columns overlap as viewed in the main axis.

In an embodiment, the movable portion further includes an upper stopping portion and an adhesive groove, wherein the upper stopping portion protrudes towards the housing along the main axis, and the adhesive groove is adjacent to the upper stopping portion. As viewed in the main axis, the frame and the movable portion partially overlap.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, it should be understood that the terms "first," "second," "third," etc. used in the following paragraphs of the present specification and the claims are merely intended to distinguish multiple same or similar elements or portions without limiting the present disclosure. The scope of the present disclosure is still referred to as the scope defined by the claims.

Figure 1:
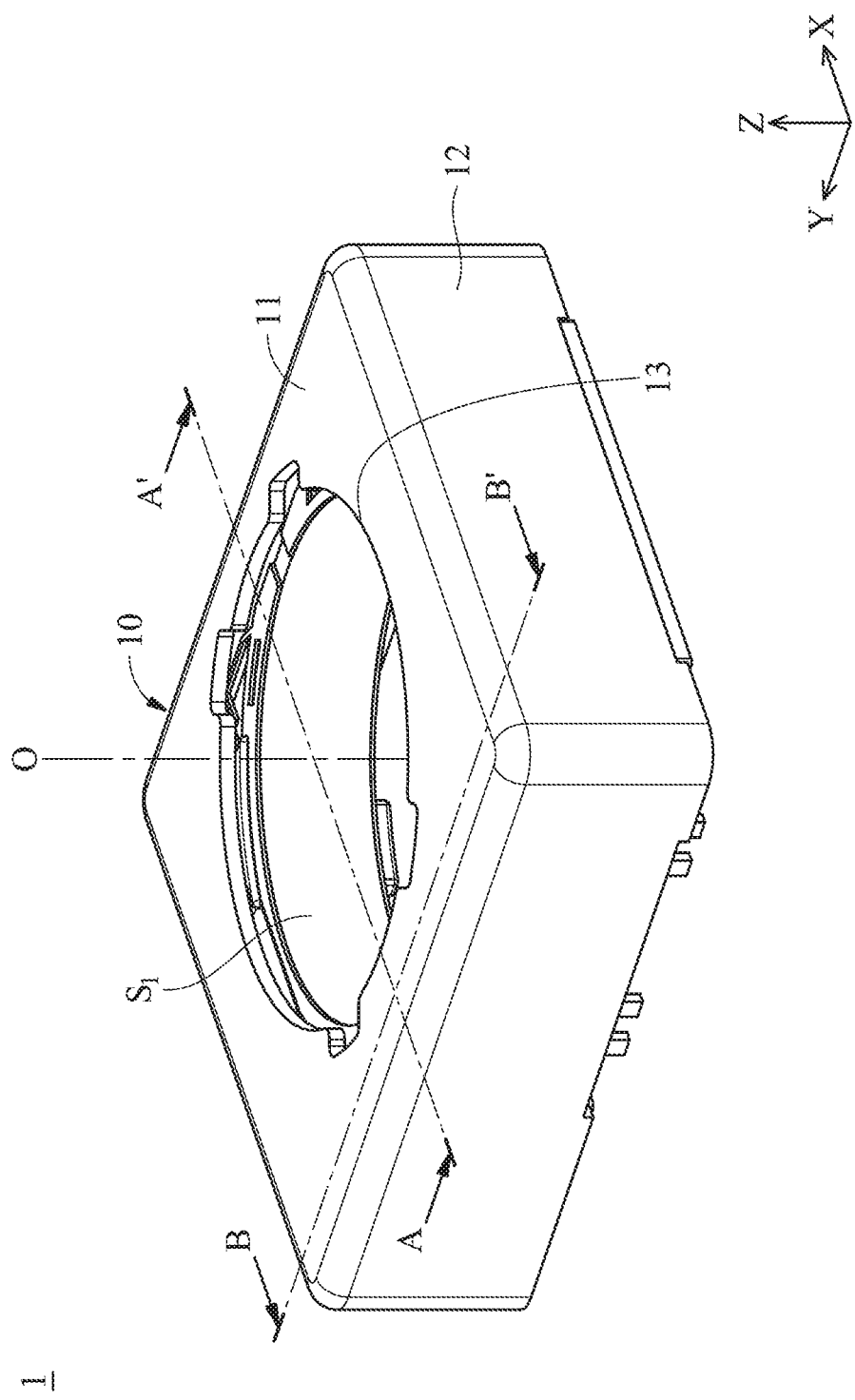
FIG. 1 is a perspective view illustrating an optical member driving mechanism in accordance with an embodiment of the present disclosure.

Refer to FIG. 1, wherein FIG. 1 is a schematic perspective view illustrating an optical member driving mechanism 1 in accordance with an embodiment of the present disclosure. It should be noted that, in this embodiment, the optical member driving mechanism 1 may be, for example, a voice coil motor (VCM), which may be disposed in the electronic devices with camera function for driving an optical member (such as a lens), and can perform an autofocus (AF) function. In addition, the optical member driving mechanism 1 has a substantial rectangular structure, wherein a housing 10 of the optical member driving mechanism 1 has includes a top wall 11 and four sidewalls 12, forming a first containing space S1. An opening 13 is formed on the top wall 11 and corresponds to the optical member (not shown). That is, an optical axis O may pass through the opening 13, such that light may enter into the optical member driving mechanism 1 via the optical axis O.

Figure 2:
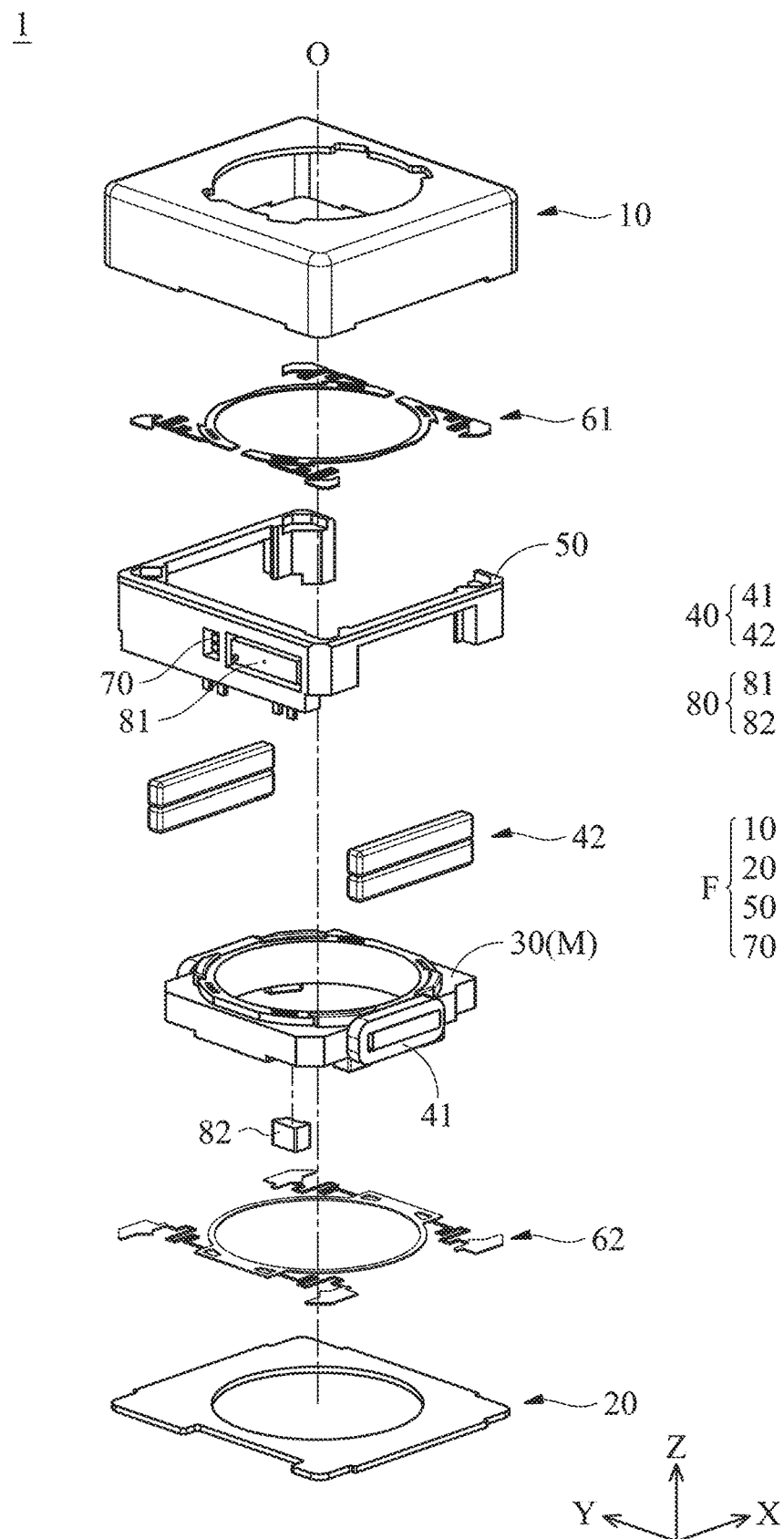
FIG. 2 is an exploded view illustrating the optical member driving mechanism shown in FIG. 1.

FIG. 2 is an exploded view illustrating the optical member driving mechanism 1 shown in FIG. 1. As shown in FIG. 2, the optical member driving mechanism 1 mainly includes a housing 10, a base 20, a carrier 30, a driving assembly 40, a frame 50, a first elastic member 61, a second elastic member 62, a circuit component 70, and a position-sensing assembly 80. In addition, the housing 10, the base 20, and the circuit component 70 may constitute a fixed portion F, and the carrier 30 is a movable portion M. The housing 10 and the base 20 may be assembled as a hollow case. Therefore, the carrier 30, the driving assembly 40, the frame 50, the first elastic member 61, and the second elastic member 62 may be surrounded by the housing 10, and thus may be contained in the case (namely, disposed in the first containing space S1).

The carrier 30 has a hollow structure, and carries an optical member with an optical axis O. The frame 50 is disposed on the base 20 and affixed to the housing 10. In addition, the carrier 30 is movably connected to the housing 10 and the base 20. To be more specific, the carrier 30 may be connected to the frame 50 through the first elastic member 61, the carrier 30 may also be connected to the base 20 through the second elastic member 62, and the first elastic member 61 and the second elastic member 62 are metallic materials. Therefore, the carrier 30 is movably suspended between the frame 50 and the base 20.

The driving assembly 40 includes two driving coils 41 and two magnetic members 42. The driving coils 41 are disposed on the carrier 30, and the magnetic members 42 may be disposed on the frame 50. When a current is applied to the driving coils 41, an electromagnetic driving force may be generated by the driving coils 41 and the magnetic members 42 to drive the carrier 30 and the optical member carried therein to move along Z-axis (the optical axis O) relative to the base 20. Therefore, the autofocus (AF) function is performed. The position-sensing assembly 80 includes a position sensor 81 and a reference member 82, wherein the position sensor 81 is disposed on the frame 50, and the reference member 82 is disposed in the carrier 30. The position sensor 81 may detect the position of the reference member 82, such that the position of the carrier 30 and the optical member may be determined.

Figure 3:
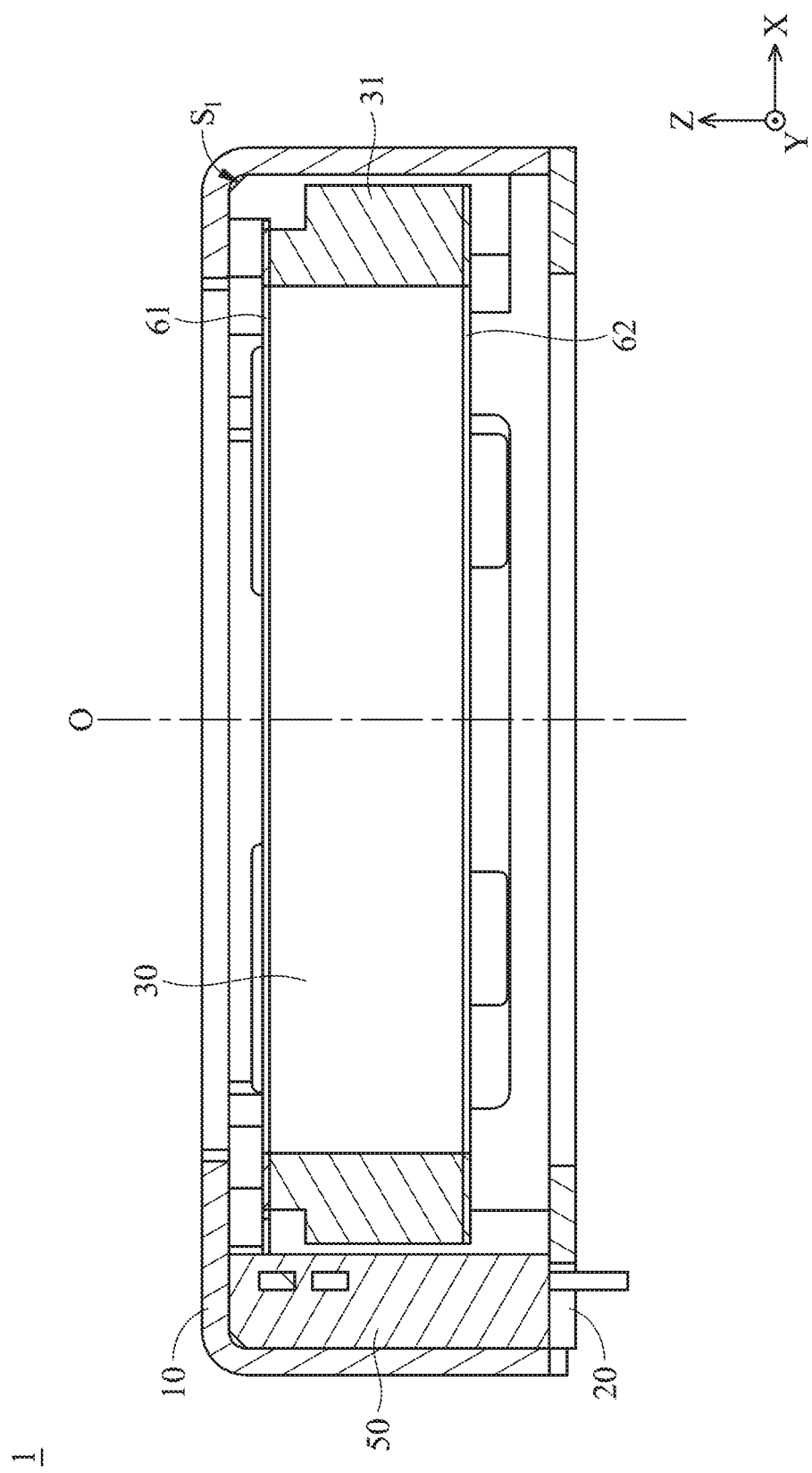
FIG. 3 is a cross-sectional view illustrating along line A-A' shown in FIG. 1.

FIG. 3 is a cross-sectional view illustrating along line A-A' shown in FIG. 1. As shown in FIG. 3, the carrier 30 and the frame 50 are disposed between the housing 10 and the base 20. In other words, the carrier 30 and the frame 50 are disposed in the first containing space S1 of the housing 10. In the present embodiment, the carrier 30 includes a positioning portion 31 protruding towards one of the sidewalls 12 of the housing 10. As viewed in a horizontal direction (Y-axis), the positioning portion 31 and the frame 50 are disposed on opposite sides of the optical member driving mechanism 1. The detailed description regarding the relationship between the positioning portion 31 and the frame 50 will be provided in accompany with FIG. 4 as follows.

Figure 4:
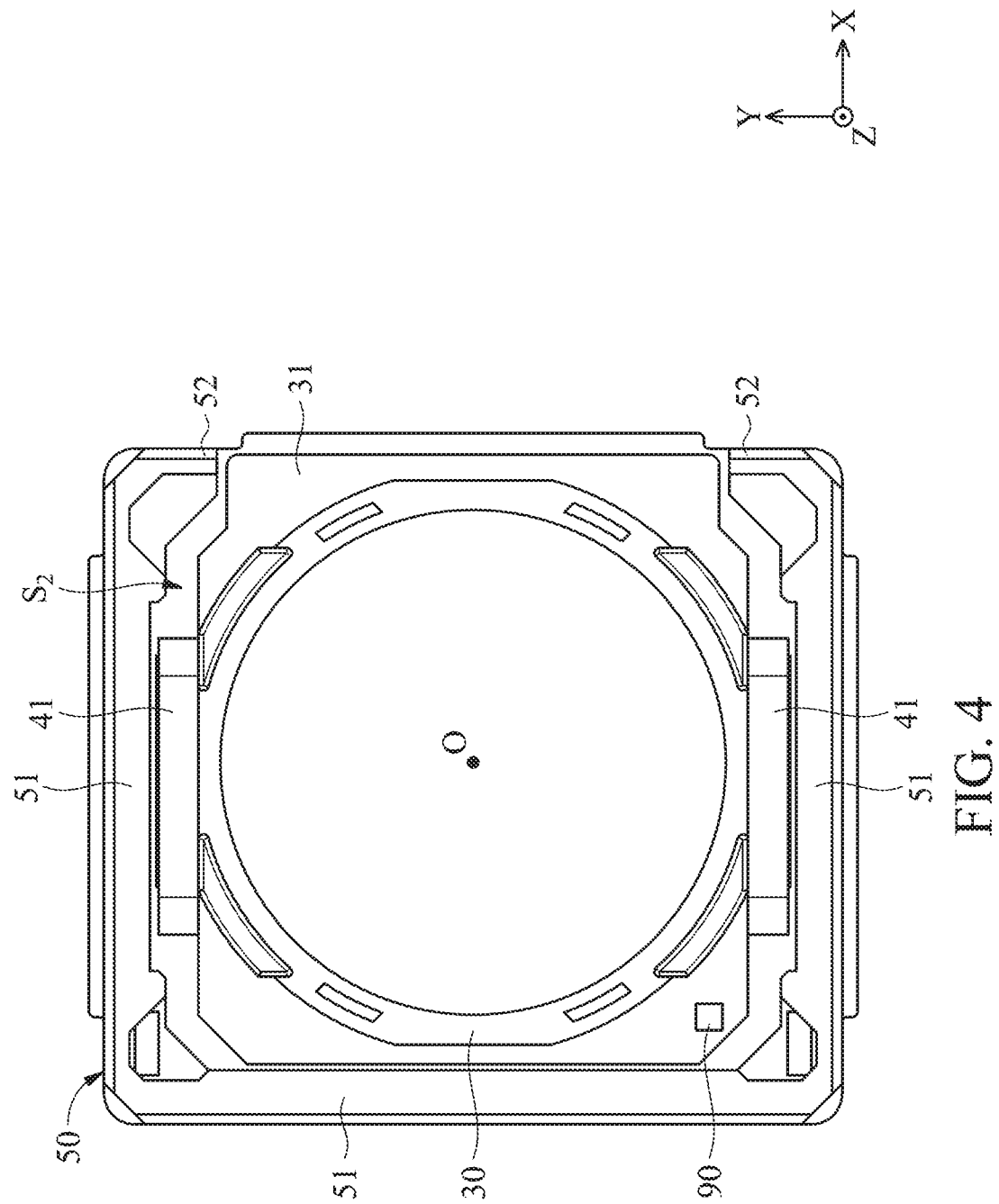
FIG. 4 is a top view illustrating an interior structure of the optical member driving mechanism in accordance with an embodiment of the present disclosure.

FIG. 4 is a top view illustrating the carrier 30 and the frame 50 shown in FIG. 1. As shown in FIG. 4, the frame 50 includes three rims 51, forming a second containing space S2. The carrier 30 is disposed in the second containing space S2. Two of the rims 51 are respectively correspond to the driving coils 41, and the magnetic members 42 (shown in FIG. 2) are disposed on the rims 51. In addition, the frame 50 further includes two protruding portions 52 that protrude from the rims 51 where the magnetic members 42 are disposed, and an opening is formed between the protruding portions 52. The protruding portions 52 have a surface facing the positioning portion 31 of the carrier 30. In other words, the positioning portion 31 is located between the protruding portions 52. Thanks to the arrangement of the protruding portions 52, the positioning portion 31 may be positioned at an appropriate position, such that the carrier 30 may be prevented from rotating on a horizontal plane (X-Y plane). Damping materials 90 are disposed between the carrier 30 and the frame 50. Therefore, buffer effect may be provided when the carrier 30 is moving, such that the carrier 30 may reach the predetermined position more rapidly. For example, the damping materials 90 may be disposed at four corners of the carrier 30.

Figure 5:
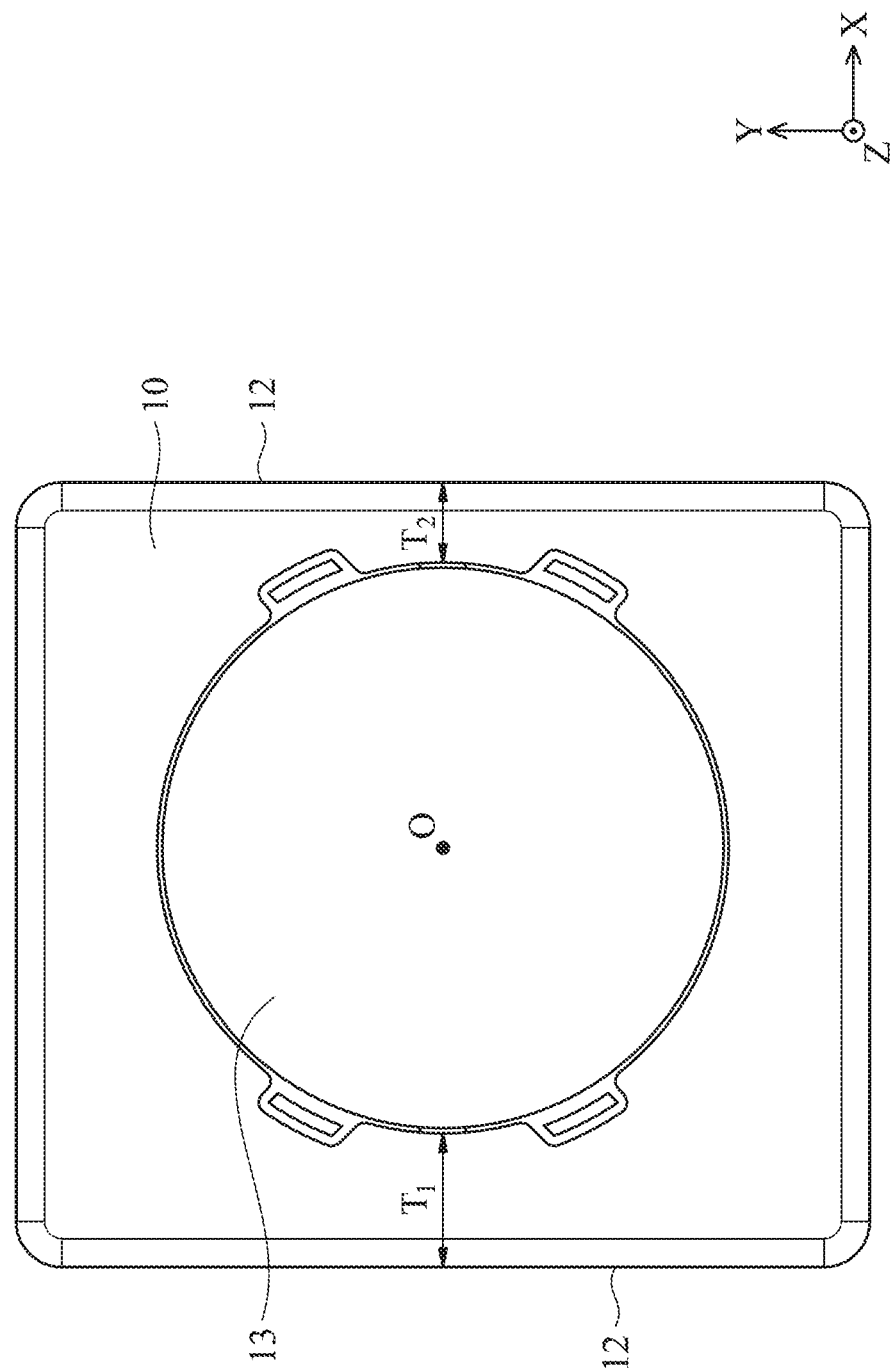
FIG. 5 is a top view illustrating the optical member driving mechanism shown in FIG. 1.

FIG. 5 is a top view illustrating the optical member driving mechanism 1 shown in FIG. 1. As shown in FIG. 5, the center of the opening 13 (that is, the position of the optical axis O) may be offset from the center of the optical member driving mechanism 1, namely, offset from the geometry center of the housing 10. In other words, a first thickness T1 between the edge of the opening 13 and one sidewall 12 may be greater than a second thickness T2 between the edge of the opening 13 and the opposite sidewall 12. Thanks to the design that the thickness of one side of the optical member driving mechanism 1 is greater, more space may be provided for arranging the display region of the electronic devices. That is, the area that the display region of the electronic devices and the optical member driving mechanism 1 overlap may be increased. As a result, the electronic devices that the optical member driving mechanism 1 is disposed therein may further meet the current demand to the consumers.

Figure 6:
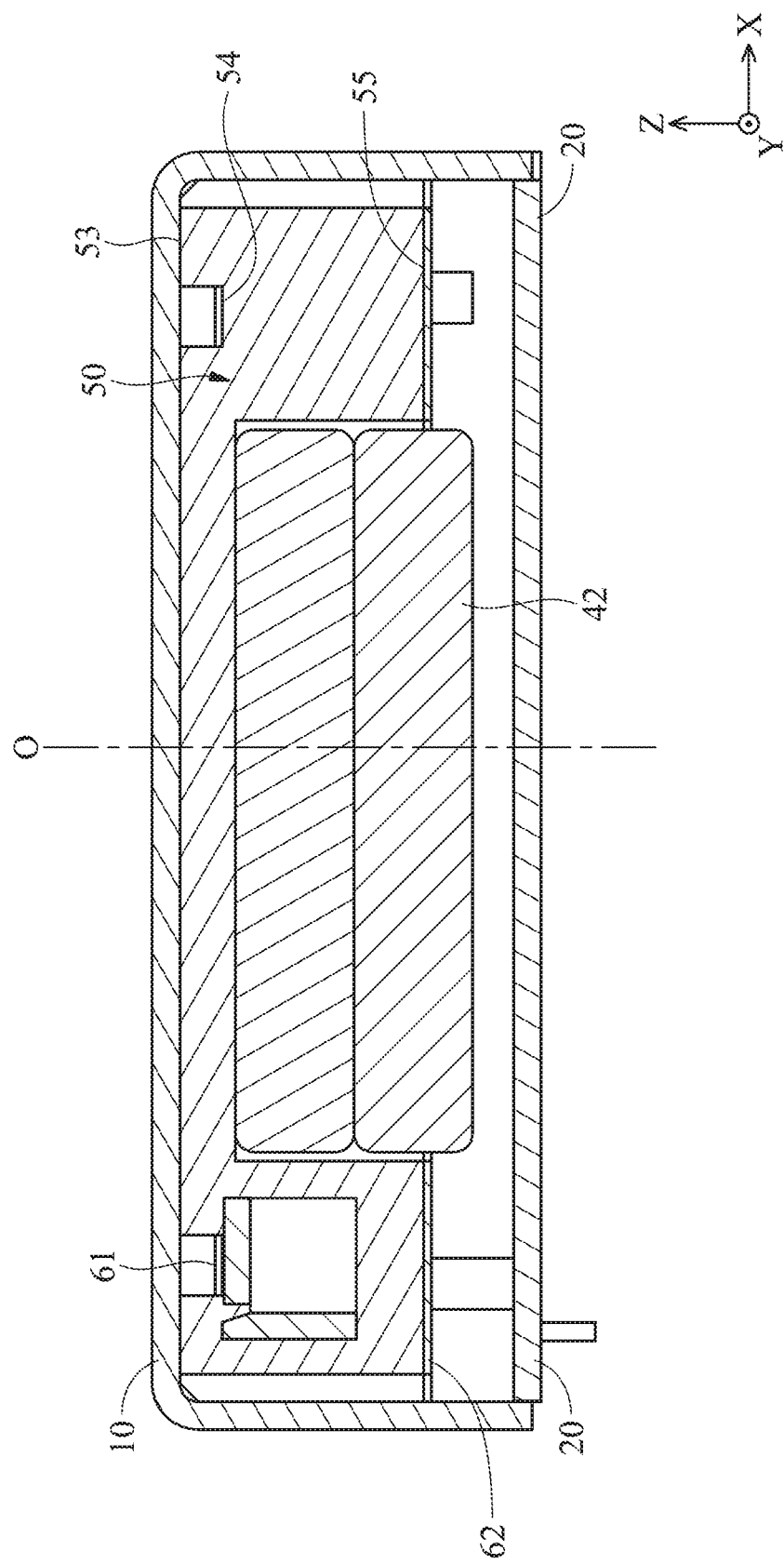
FIG. 6 is a cross-sectional view illustrating the optical member driving mechanism in accordance with an embodiment of the present disclosure.

FIG. 6 is a cross-sectional view illustrating the optical member driving mechanism 1 in accordance with an embodiment of the present disclosure. In the present embodiment, the frame 50 includes a first surface 53, a second surface 54, and a third surface 55, wherein the first surface 53 and the second surface 54 are towards the housing 10, and the third surface 55 is towards the base 20. In other words, the first surface 53, the second surface 54 and the third surface 55 are located on opposite sides of the frame 50. As shown in FIG. 6, the first surface 53 is higher than the second surface 54, which means the spacing between the first surface 53 and the top wall 11 is shorter than the spacing between the second surface 54 and the top wall 11. In some embodiment, the first surface 53 may abut the housing 10. The first elastic member 61 is disposed on the second surface 54, and thereby the space for arranging the first elastic member 61 between the housing 10 and the frame 50 may be omitted. Therefore, the overall height of the optical member driving mechanism 1 may be reduced.

Furthermore, the second elastic member 62 is disposed on the third surface 55. As a result, a structure that the second elastic member 62 rests on is not required to be disposed on the base 20. The structure of the base 20 may be simplified, such that the manufacturing cost of the base 20 may be reduced, and the miniaturization of the optical member driving mechanism 1 may be achieved. In some embodiments, the circuit component 70 is partially exposed from the third surface 55 and electrically connected to the second elastic member 62. The driving assembly 40 is electrically connected to the circuit component 70 via the second elastic member 62.

Figure 7:
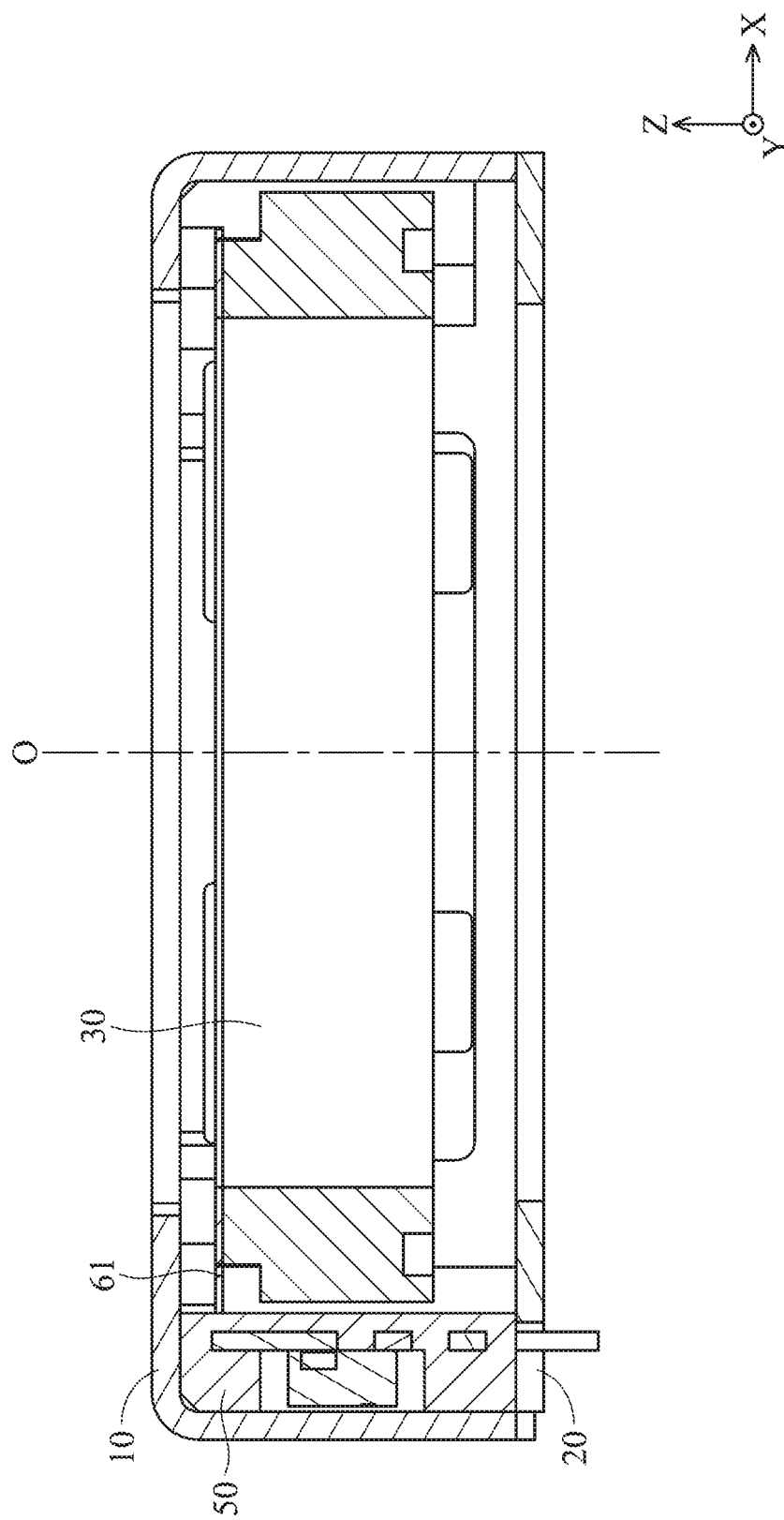
FIG. 7 is a cross-sectional view illustrating the optical member driving mechanism in accordance with another embodiment of the present disclosure.

FIG. 7 is a cross-sectional view illustrating the optical member driving mechanism 1 in accordance with another embodiment of the present disclosure. As shown in FIG. 7, in the present embodiment, only the first elastic member 61 is disposed in the optical member driving mechanism 1, such that the suspended center of gravity of the first elastic member 61 is closer to the center of the optical member (not shown). As a result, the carrier 30 may move more stably, and the overall height of the optical member driving mechanism 1 may be reduced. In other embodiments, only the second elastic member 62 is disposed in the optical member driving mechanism 1, and the overall height of the optical member driving mechanism 1 may also be reduced. In addition, thanks to arranging single elastic member, the manufacturing cost may be reduced.

Figure 8:
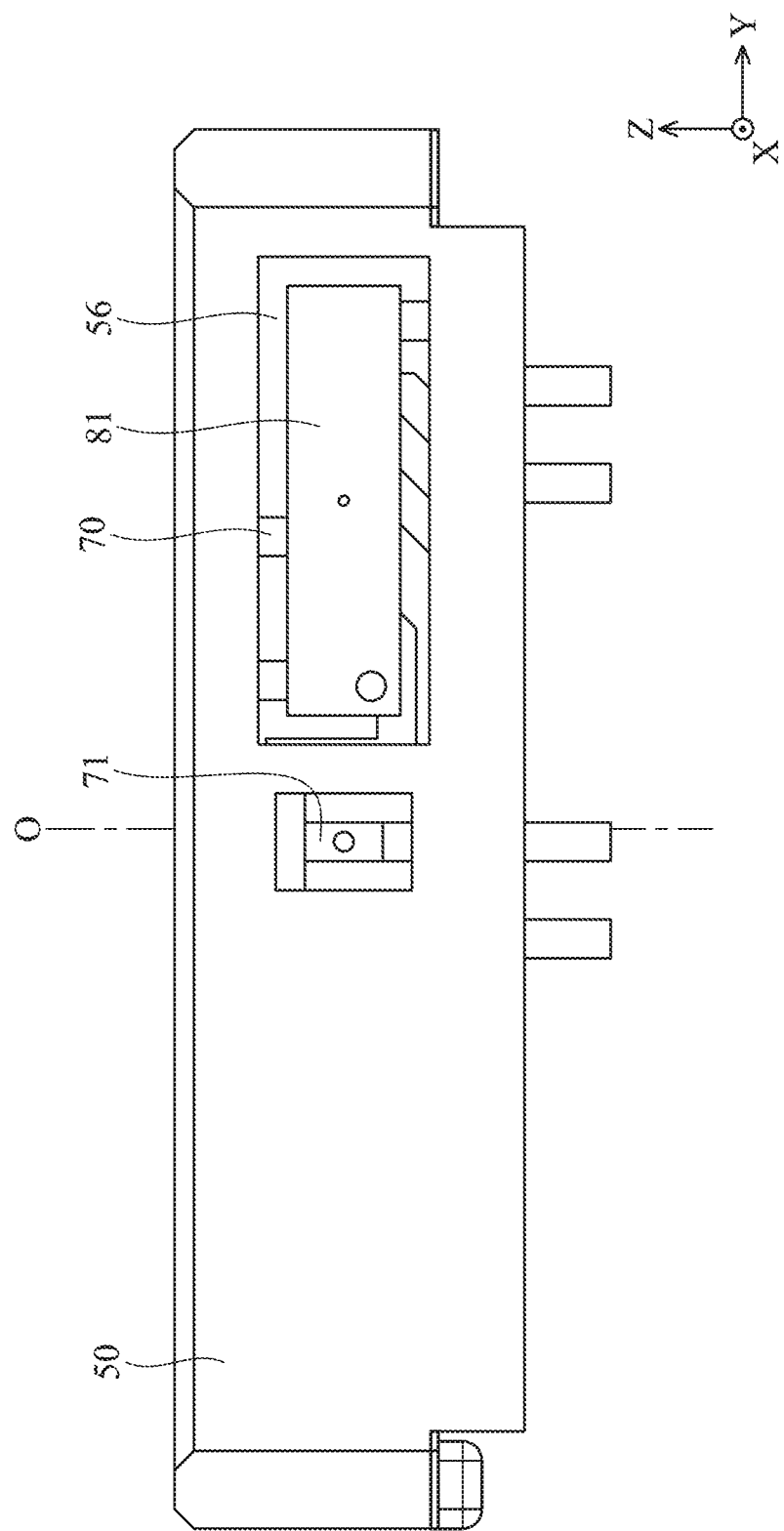
FIG. 8 is a side view illustrating a frame and a circuit component in accordance with an embodiment of the present disclosure.

FIG. 8 is a side view illustrating the frame 50 and the circuit component 70 in accordance with an embodiment of the present disclosure. In the present embodiment, the circuit component 70 is formed in the frame 50 by insert molding. In addition, recesses 56 are formed on a lateral side of the frame 50 in order to accommodate an electronic element 71 and the position sensor 81. In other words, the frame 50 may surround the electronic element 71 and the position sensor 81. The electronic element 71 and the position sensor 81 are electrically connected to the circuit component 70. For example, the electronic element 71 may be a capacitor, and may filter noise in the electrical signals. The position sensor 81 is configured to detect the position of the reference member 82 such that the position of the optical member may be determined. Although two recesses 56 are disposed in the present embodiment for containing the electronic element 71 and the position sensor 81, however, single recess 56 may also be disposed for containing the electronic element 71 and the position sensor 81 in some embodiments. Thanks to arranging the circuit component 70 in the frame 50, no conductive structure is required to be disposed in the frame 50 such that the thickness of the base 20 may be effectively reduced.

Figure 9:
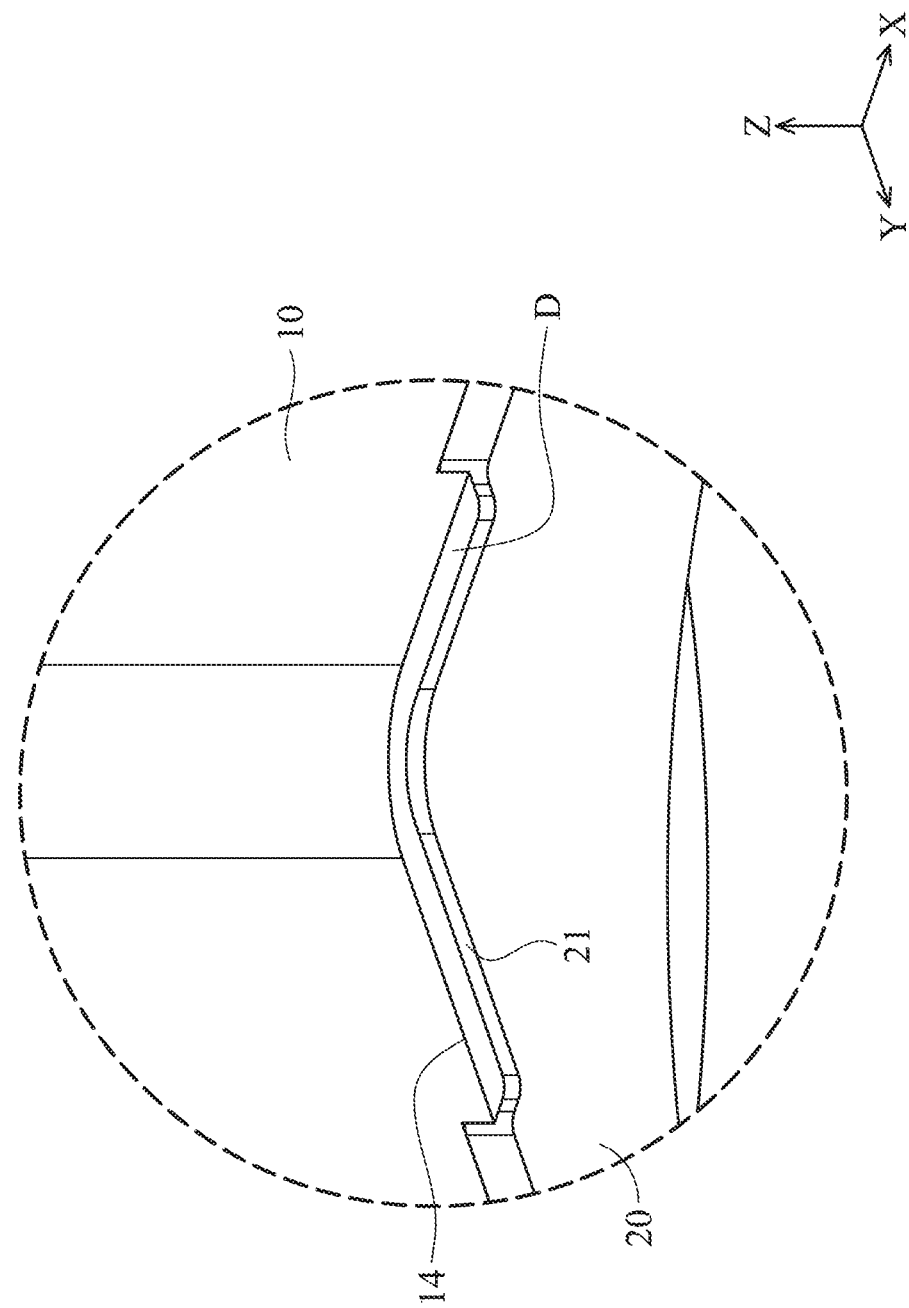
FIG. 9 is a partial perspective view illustrating the optical member driving mechanism in accordance with an embodiment of the present disclosure.

FIG. 9 is a partial perspective view illustrating the optical member driving mechanism 1 in accordance with an embodiment of the present disclosure. As shown in FIG. 9, the housing 10 has a bonding portion 14 that is located at a corner of the housing 10 and extends downwards along Z-axis. The base 20 has a recess 21 corresponding to the bonding portion 14. In other words, after the housing 10 and the base 20 are combined, the bonding portion 14 and the recess 21 may at least partially overlap as viewed in a direction that is perpendicular to the Z-axis (the optical axis O). In addition, when the housing 10 and the base 20 are combined, a step D may be formed by the bonding portion 14 and the recess 21. An adhesive may be filled into the step D so as to firmly connect the housing 10 and the base 20. Thanks to the arrangement of the step D, the overflowing issue of the adhesive may be reduced. In some embodiments, the housing 10 and the base 20 are formed by metallic material, and are connected to each other in a welding or soldering manner.

Figure 10:
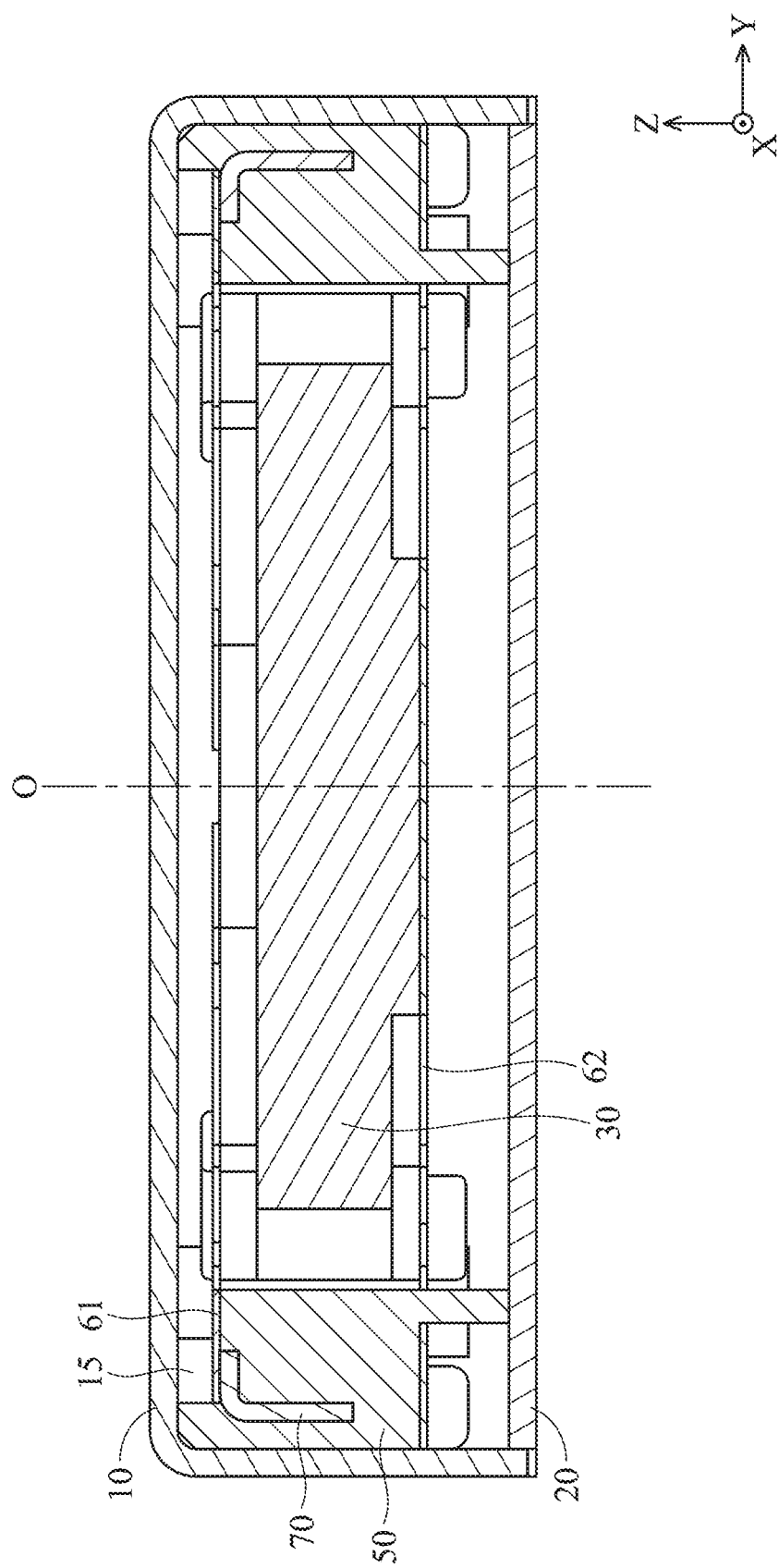
FIG. 10 is a cross-sectional view illustrating along line B-B' shown in FIG. 1.

FIG. 10 is a cross-sectional view illustrating along line B-B' shown in FIG. 1. As shown in FIG. 10, the first elastic member 61 may be electrically connected to the circuit component 70. In addition, the housing 10 has an insulating structure 15 that abuts the first elastic member 61. Therefore, the short circuit issue due to the electrical connection between the first elastic member 61 and the housing 10 may be prevented. In some embodiments, the first elastic member 61 may be electrically connected to the circuit component 70 by soldering. In other embodiments, the first elastic member 61 may be electrically connected to the circuit component 70 by arranging a conductive gel. In some embodiments, the housing 10 may recess downwards along the optical axis O at the place where the first elastic member 61 is electrically connected to the circuit component 70. Accordingly, the housing 10 abuts the first elastic member 61 in order to enhance the bonding strength between the first elastic member 61 and the circuit component.

Figure 11:
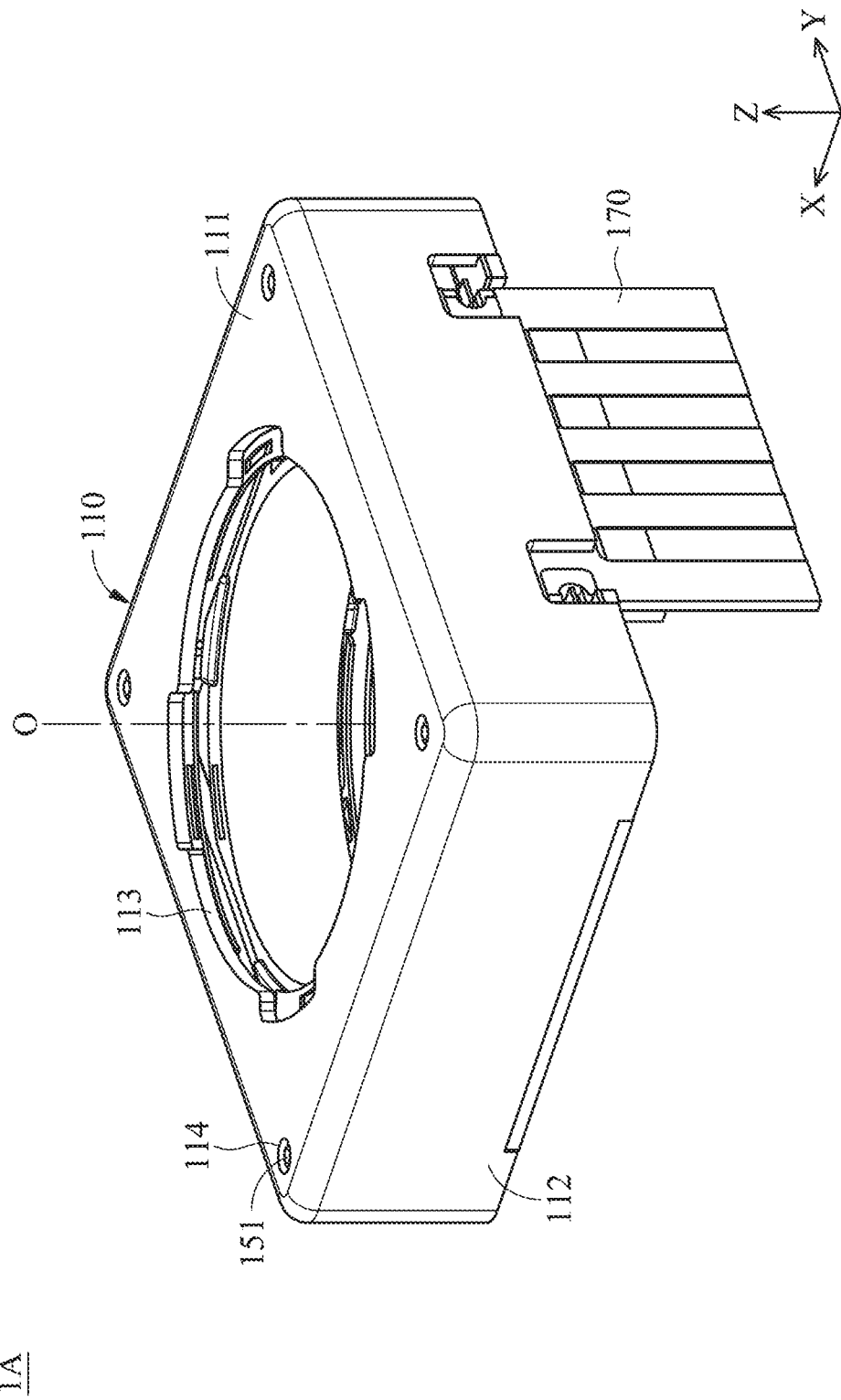
FIG. 11 is a perspective view illustrating an optical member driving mechanism in accordance with another embodiment of the present disclosure.

FIG. 11 is a perspective view illustrating an optical member driving mechanism 1A in accordance with another embodiment of the present disclosure. As shown in FIG. 11, the optical member driving mechanism 1A has a substantial rectangular structure, wherein a housing 110 of the optical member driving mechanism 1A has includes a top wall 111 and four sidewalls 112. An opening 113 is formed on the top wall 111 and corresponds to the optical member (not shown). That is, an optical axis O may pass through the opening 113, such that light may enter into the optical member driving mechanism 1A via the optical axis O. It should be noted that a bonding portion 114 is formed on the top wall 111 and corresponds to a fixed column 151 of a frame 150 (shown in FIG. 12). In the present embodiment, the bonding portion 114 may be a hole, and the fixed column 151 may be inserted into the bonding portion 114 in order to complete the assembly and achieve the positioning effect.

Figure 12:
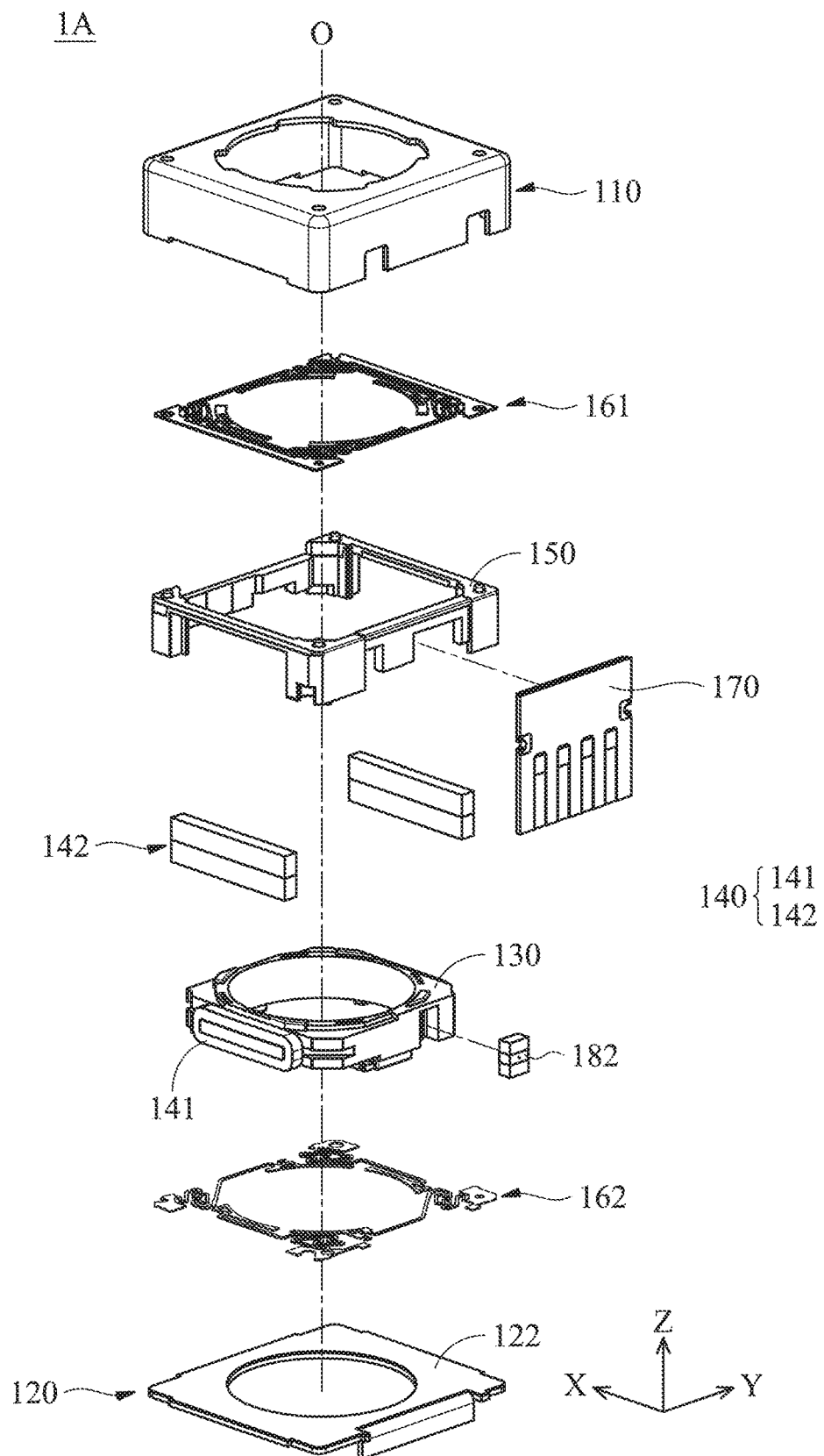
FIG. 12 is an exploded view illustrating the optical member driving mechanism shown in FIG. 11.

FIG. 12 is an exploded view illustrating the optical member driving mechanism 1A shown in FIG. 11. It should be noted that the optical member driving mechanism 1A in the present embodiment may include the same or similar elements to the optical member driving mechanism 1 shown in FIG. 2, and those same or similar elements are labeled with similar numerals and will not be described in detail again. As shown in FIG. 12, the optical member driving mechanism 1A mainly includes a housing 110, a base 120, a carrier 130, a driving assembly 140, a frame 150, a first elastic member 162, a second elastic member 161, a circuit component 170, and a reference member 182. For example, the circuit component 170 may be a printed circuit board (PCB), a flexible printed circuit (FPC), or any other suitable circuit board. The circuit component 170 may be disposed on one side of the frame 150, and may transmit electric signals to driving coils 141 in the optical member driving mechanism 1A. In addition, the position sensor (not shown) may be disposed on the circuit component 170, and may detect the position of the reference member 182 so as to determine the position of the carrier 130.

Figure 13:
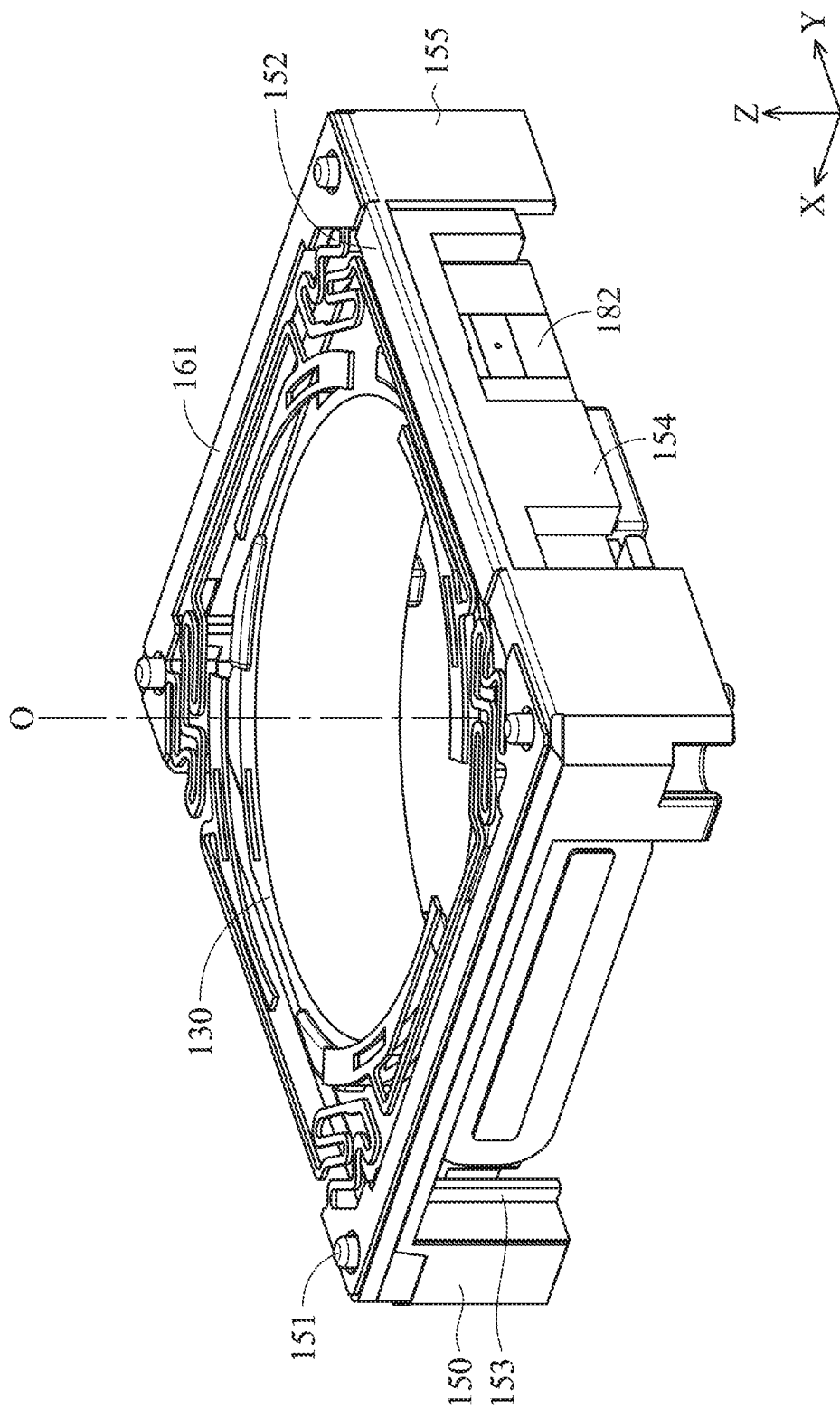
FIG. 13 is a perspective view illustrating a frame, a carrier, and a second elastic member in accordance with an embodiment of the present disclosure.

FIG. 13 is a perspective view illustrating the frame 150, the carrier 130, and the second elastic member 161 in accordance with an embodiment of the present disclosure. As shown in FIG. 13, the frame 150 includes a fixed column 151, a protruding portion 152, a positioning structure 153, a first abutting surface 154, and a second abutting surface 155. The fixed column 151 protrudes from four corners of the frame 150 along the Z-axis, and may be positioned with the bonding portion 114 (shown in FIG. 11) of the housing 110. Furthermore, the fixed column 151 may be provided for arranging the second elastic member 161. In other words, the fixed column 151 is the connecting point between the second elastic member 161 and the frame 150. The second elastic member 161 is disposed between the housing 110 and the frame 150. As viewed in a direction that is perpendicular to the optical axis O, the size of the frame 150 may be greater than or equal to the size of the second elastic member 161. That is, the second elastic member 161 does not extend out of the frame 150 along a horizontal direction (X-Y plane). In addition, as viewed along the optical axis O, the second elastic member 161 may overlap with two sides of the frame 150, and the former two sides are opposite sides of the frame 150. The second elastic member 161 may also overlap with the driving assembly 140 (including the driving coils 141 and magnetic members 142) on the two sides.

The protruding portion 152 is located on one side of the frame 150, and protrudes from the frame 150 along the Z-axis (namely, optical axis O). In some embodiments, the top surface of the protruding portion 152 is level with the top surface of the second elastic member 161. Therefore, the overall height of the optical member driving mechanism 1A may be reduced, achieving miniaturization. In addition, the positioning structure 153 is disposed on a lateral side of the frame 150. The positioning structure 153 is disposed between the driving coil 141 and the magnetic member 142. When the magnetic member 142 is disposed on the frame 150, the magnetic member 142 is located between the positioning structure 153 and the housing 110. If the magnetic member 142 abuts the positioning structure 153, it can be determined that the magnetic member 142 has been disposed at correct position. Therefore, the difficulty of the assembly may be reduced.

The first abutting surface 154 and the second abutting surface 155 are disposed on one side of the frame 150 and configured to abut the circuit component 170. Accordingly, the stability of arranging the circuit component 170 may be enhanced. If the size of the circuit component 170 is small, the circuit component 170 may abut the first abutting surface 154. Rather, if the size of the circuit component 170 is large, the circuit component 170 may abut the second abutting surface 155. In the present embodiment, the protruding portion 152, the first abutting surface 154, and the second abutting surface 155 are disposed on the same side of the frame 150. Therefore, if the circuit component 170 abuts the first abutting surface 154, the protruding portion 152 and the circuit component 170 may at least partially overlap as viewed along the optical axis O.

Figure 14:
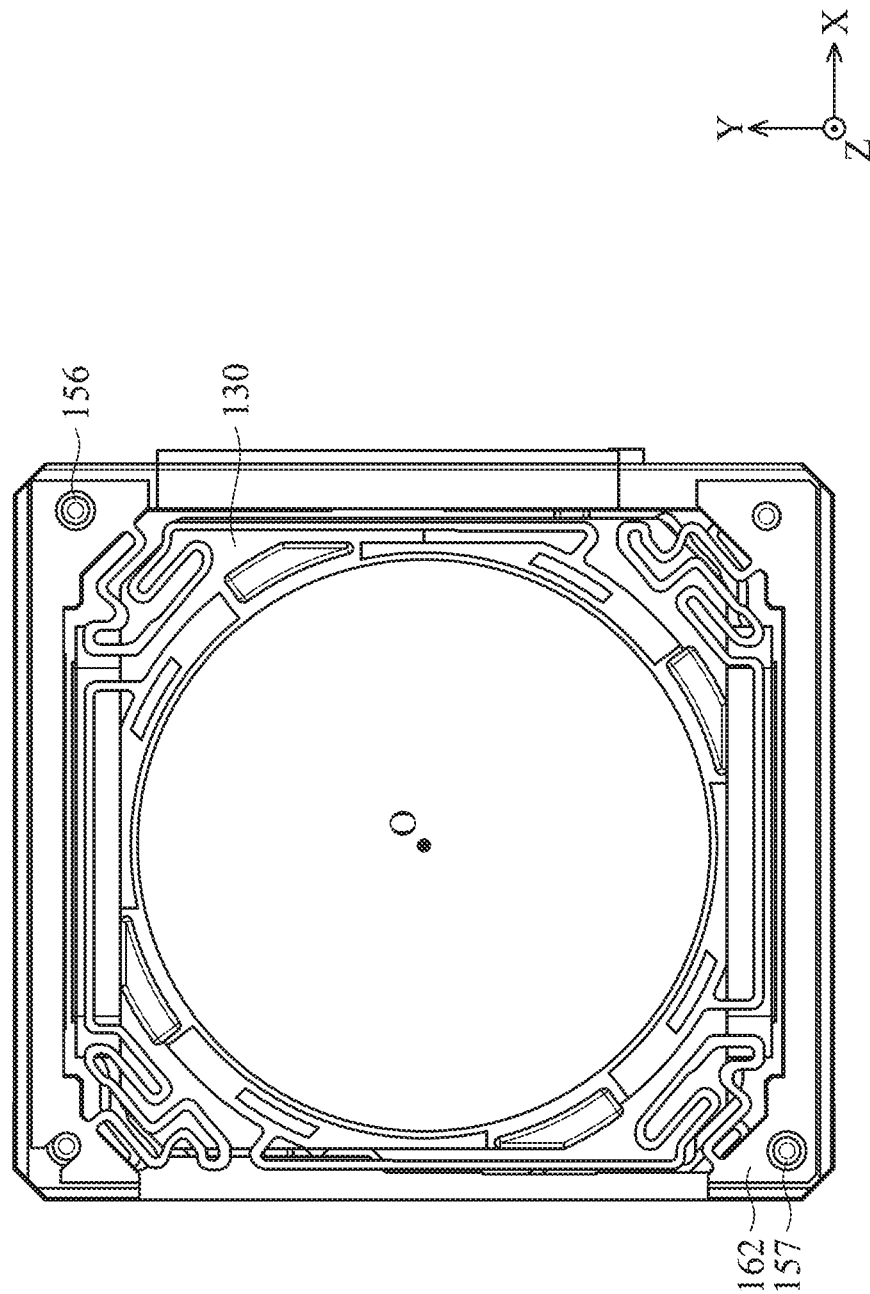
FIG. 14 is a bottom view illustrating the frame, the carrier, and a first elastic member in accordance with another embodiment of the present disclosure.

FIG. 14 is a bottom view illustrating the frame 150, the carrier 130, and the first elastic member 162 in accordance with another embodiment of the present disclosure. As shown in FIG. 14, the frame 150 further includes protruding columns 156 and holes 157. The protruding columns 156 and the holes 157 are disposed on a lower surface of the frame 150 (namely, the surface that faces the base 120). The first elastic member 162 is connected to the frame 150 at the protruding columns 156 and the holes 157. During the assembly, the protruding columns 156 may be configured for positioning the first elastic member 162, and the holes 157 are configured for filling an adhesive so as to affix the first elastic member 162 to the frame 150. It should be noted that in some embodiments, a gap is formed between the frame 150 and the base 120, and the frame 150 and the base 120 do not directly contact. For example, the gap may be configured to fill the adhesive in order to combine the frame 150 and the base 120.

Figure 15:
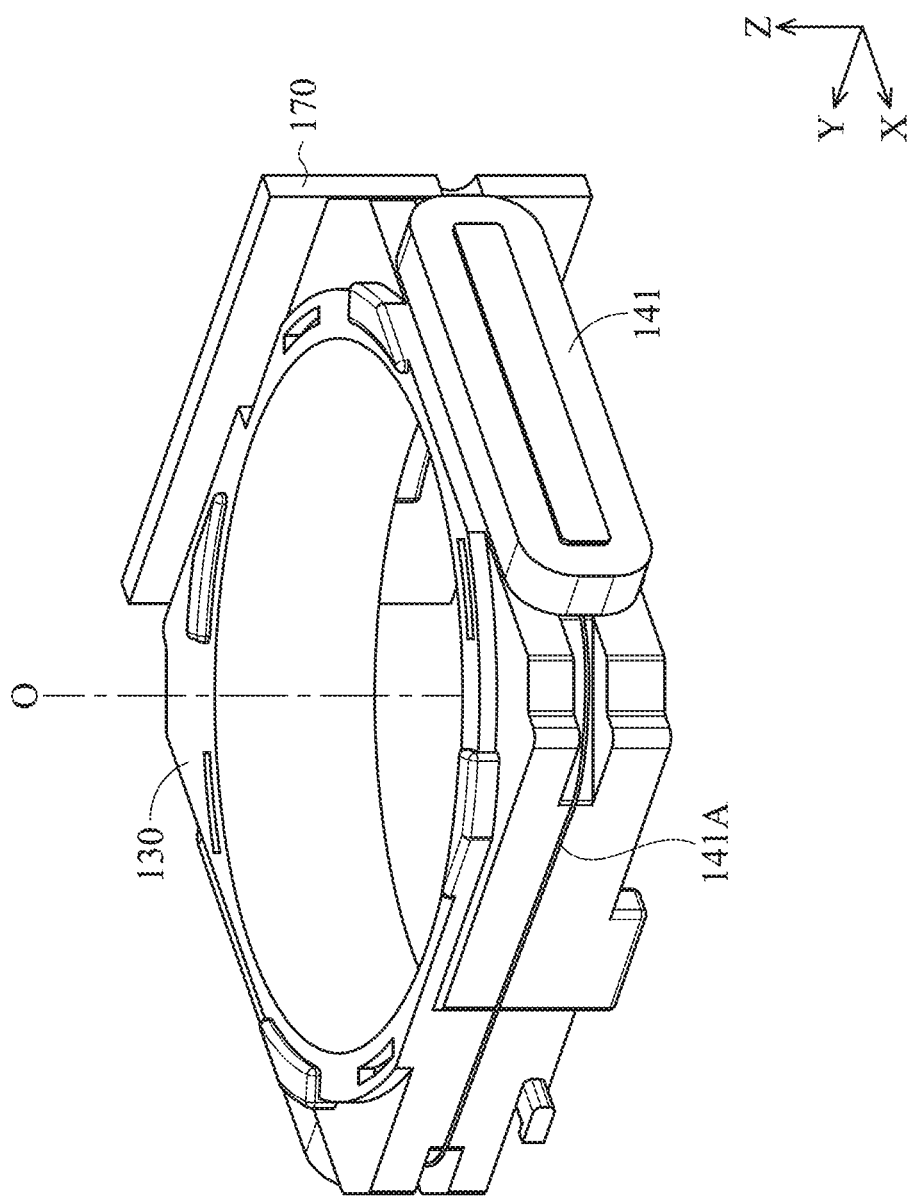
FIG. 15 is a perspective view illustrating the carrier and a circuit component in accordance with an embodiment of the present disclosure.

FIG. 15 is a perspective view illustrating the carrier 130 and the circuit component 170 in accordance with an embodiment of the present disclosure. In the present embodiment, the driving coils 141 are disposed on opposite sides of the carrier 130, and a connecting wire 141A is disposed between the driving coils 141. The driving coils 141 are electrically connected via the connecting wire 141A. The connecting wire 141A is disposed on one side of the carrier 130, and the circuit component 170 is disposed on another side that is opposite to the side where the connecting wire 141A is disposed. In other words, the connecting wire 141A and the circuit component 170 at least partially overlap as viewed in a direction that is perpendicular to the optical axis O.

Figure 16:
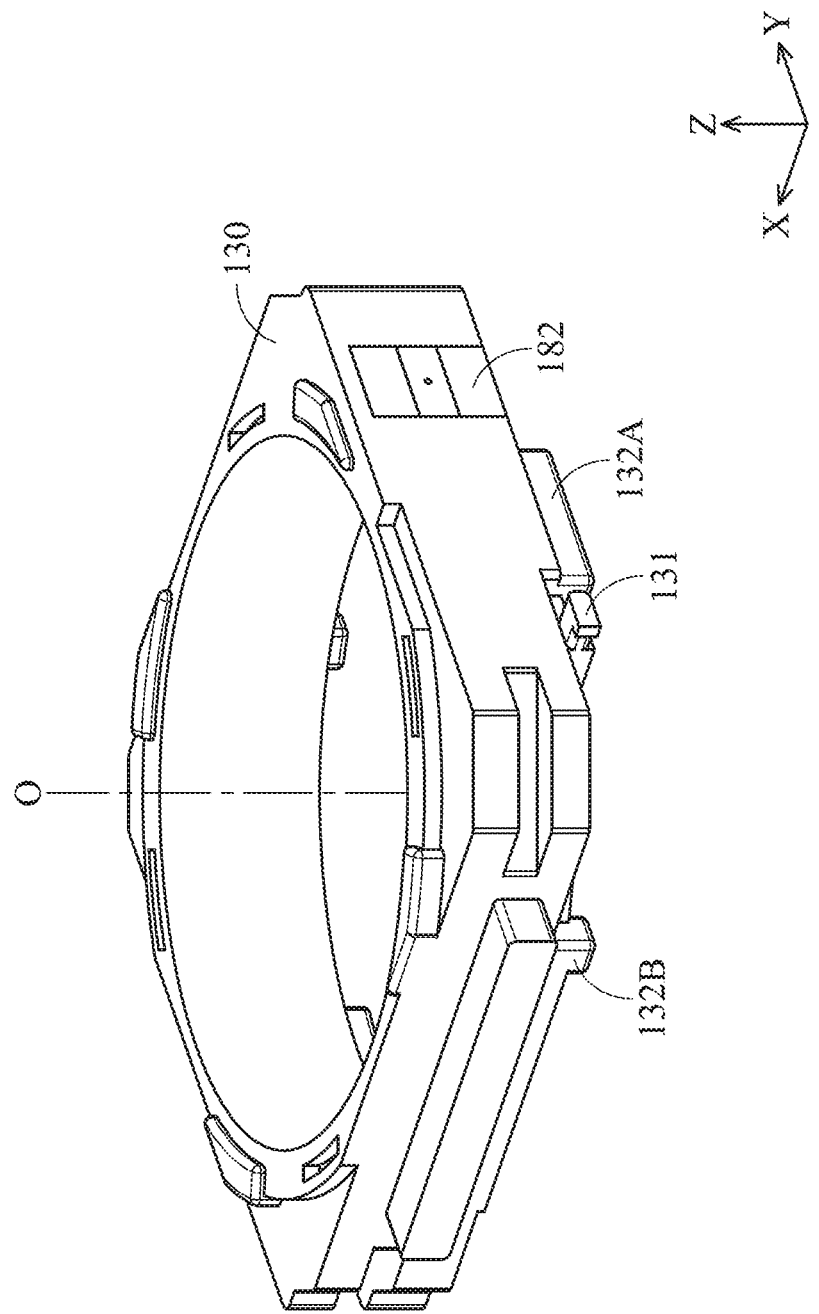
FIG. 16 is a perspective view illustrating the carrier in accordance with another embodiment of the present disclosure.

FIG. 16 is a perspective view illustrating the carrier 130 in accordance with another embodiment of the present disclosure. As shown in FIG. 16, the carrier 130 includes a wiring column 131, a first stopping portion 132A, and a second stopping portion 132B. It should be noted that in the present embodiment, the first stopping portion 132A and the second stopping portion 132B may be referred to as "stopping portions 132A, 132B." The wiring column 131 is disposed on a lateral side of the carrier 130 for wiring the driving coil 141, and is electrically connected to the circuit component 170. The stopping portions 132A, 132B are disposed on the carrier 130 and protrude from a lower surface (namely, the surface that faces the base 120) of the carrier 130. The first stopping portion 132A and the second stopping portion 132B are each located on different sides of the carrier 130. In the present embodiment, the size of the first stopping portion 132A is greater than the size of the second stopping portion 132B. In other words, the distance between the first stopping portion 132A and the base 120 is shorter than the distance between the second stopping portion 132B and the base 120.

In some embodiments, the insulating layer 122 (shown in FIG. 12) is not disposed on the position, which corresponds to the stopping portions 132A, 132B, of the base 120. As viewed along the optical axis O, the first stopping portion 132A, the second stopping portion 132B and the insulating layer 122 do not overlap. As a result, the overall height of the optical member driving mechanism 1A may be reduced, achieving miniaturization. In addition, as shown in FIG. 16, recesses are disposed at the corners of the upper surface of the carrier 130, except for the corner where the reference member 182 is disposed. That way, more space is provided for the second elastic member 161 to move.

As set forth above, an optical member driving mechanism including a frame, where a circuit component is disposed, is provided in the embodiments of the present disclosure. By means of embedding the circuit component into the frame, the interior structure of the optical member driving mechanism may be simplified, and/or the structural strength of the optical member driving mechanism may be enhanced. In addition, in some embodiments, the elastic member is disposed on a surface of the frame. That way, the overall height of the optical member driving mechanism may be reduced, such that miniaturization is achieved.

Figure 17:
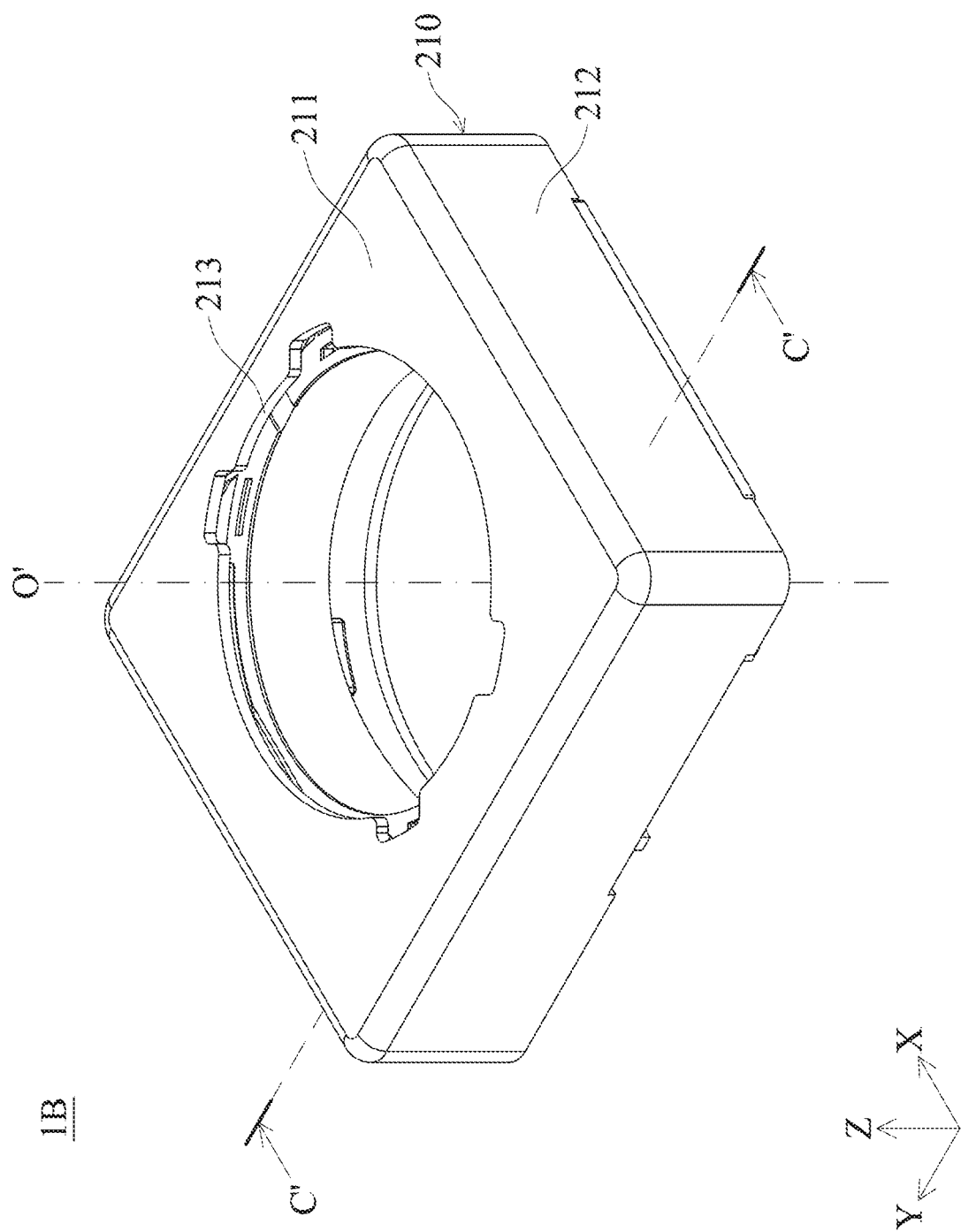
FIG. 17 is a perspective view illustrating an optical member driving mechanism in accordance with an embodiment of the present disclosure.

FIG. 17 is a schematic perspective view illustrating an optical member driving mechanism 1B in accordance with an embodiment of the present disclosure. It should be noted that, in this embodiment, the optical member driving mechanism 1B may be, for example, a voice coil motor (VCM), which may be disposed in the electronic devices with camera function for driving an optical member (such as a lens), and can perform an autofocus (AF) function. In addition, the optical member driving mechanism 1B has a substantial rectangular structure, wherein a housing 210 of the optical member driving mechanism 1B has includes a top wall 211 and four sidewalls 212. An opening 213 is formed on the top wall 211 and corresponds to the optical member (not shown). That is, an optical axis O' may pass through the opening 213, such that light may enter into the optical member driving mechanism 1B via the optical axis O'.

Figure 18:
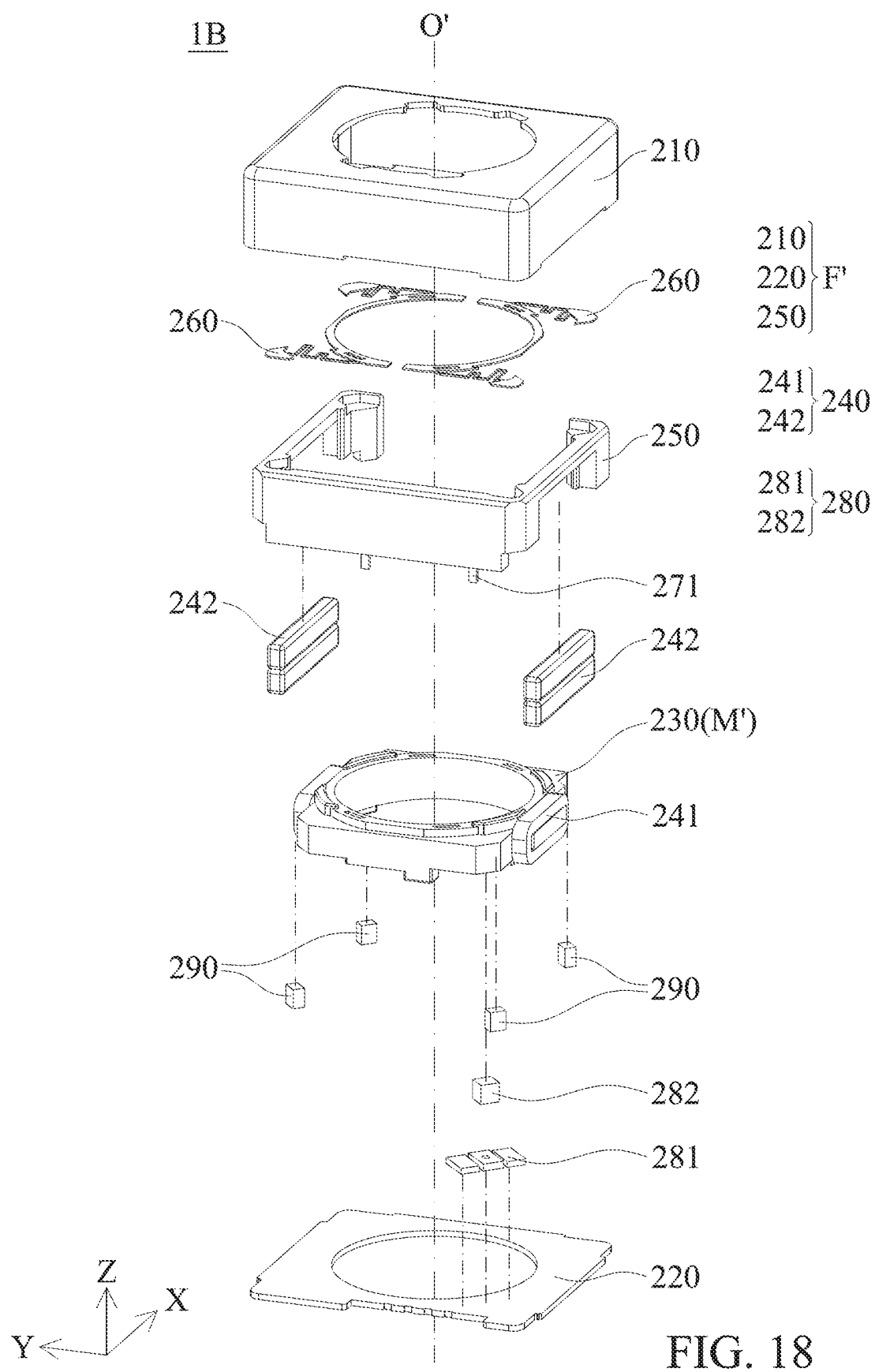
FIG. 18 is an exploded view illustrating the optical member driving mechanism shown in FIG. 17.

FIG. 18 is an exploded view illustrating the optical member driving mechanism 1B shown in FIG. 17. As shown in FIG. 18, the optical member driving mechanism 1B mainly includes a housing 210, a base 220, a carrier 230, a driving assembly 240, a frame 250, an elastic member 260, a first circuit assembly 271, a position-sensing assembly 280, and damping materials 290. In addition, the housing 210, the base 220, and the frame 250 may constitute a fixed portion F', and the carrier 230 is a movable portion M'. The housing 210 and the base 220 may be assembled as a hollow case. Therefore, the carrier 230, the driving assembly 240, the frame 250, the elastic member 260 may be surrounded by the housing 210, and thus may be contained in the case. Accordingly, the housing 210, the frame 250, and the base 220 are sequentially arranged along the optical axis O'. In other words, the light may sequentially pass through the housing 210, the frame 250, and the base 220 and reach an image device (not shown) that is disposed out of the optical member driving mechanism 1B such that an image is generated.

The carrier 230 has a hollow structure, and carries an optical member with an optical axis O'. The frame 250 is disposed on the base 220 and affixed to the housing 210. In addition, the carrier 230 is movably connected to the housing 210 and the base 220. The elastic member 260 is disposed between the housing 210 and the frame 250. To be more specific, the carrier 230 may be connected to the frame 250 through the elastic member 260, which is made of metallic materials. Therefore, the carrier 230 is movably suspended between the frame 250 and the base 220.

The driving assembly 240 includes two driving coils 241 and two magnetic members 242. The driving coils 241 are disposed on the carrier 230, and the magnetic members 242 may be disposed on the frame 250. When a current is applied to the driving coils 241, an electromagnetic driving force may be generated by the driving coils 241 and the magnetic members 242 to drive the carrier 230 and the optical member carried therein to move along Z-axis (the optical axis O) relative to the base 220. Therefore, the autofocus (AF) function is performed. In other embodiment, the positions of the driving coils 241 and the magnetic members 242 are interchangeable. In other words, the driving coils 241 may be disposed on the frame 250, and the magnetic members 242 may be disposed on the carrier 230. That way, the autofocus (AF) function may also be achieved.

The position-sensing assembly 280 includes a position sensor 281 and a reference member 282, wherein the position sensor 281 is disposed on the base 220, and the reference member 282 is disposed in the carrier 230. The position sensor 281 may detect the position of the reference member 282, such that the position of the carrier 230 and the optical member may be determined. Accordingly, the driving assembly 240 may drive the movable portion M' to move relative to the fixed portion F' based on the result detected by the position sensor 281.

Figure 19:
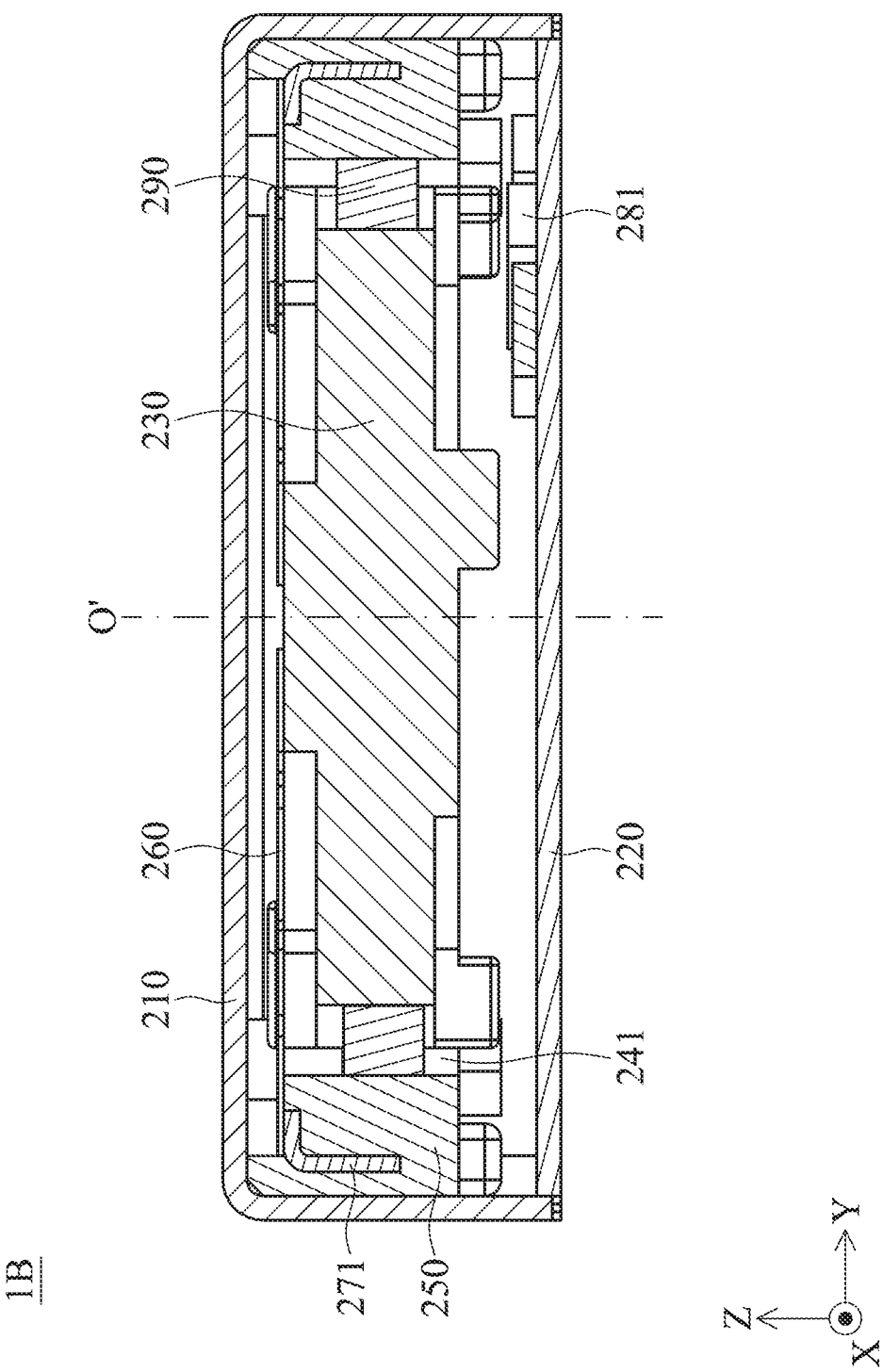
FIG. 19 is a cross-sectional view illustrating along line C-C' shown in FIG. 17.

FIG. 19 is a cross-sectional view illustrating along line C-C' shown in FIG. 17. As shown in FIG. 19, the first circuit assembly 271 is disposed in the frame 250 and partially exposed from an upper surface of the frame 250. In the present embodiment, the first circuit assembly 271 is electrically connected to a driving unit that is disposed out of the optical member driving mechanism 1B, and transmits electric signals to the driving coils 241 for controlling the operation of the optical member driving mechanism 1B. The first circuit assembly 271 is electrically connected to the driving coils 241 via the elastic member 260. In other words, the elastic member 260 may be electrically connected to the first circuit assembly 271 and the driving coils 241.

Figure 20:
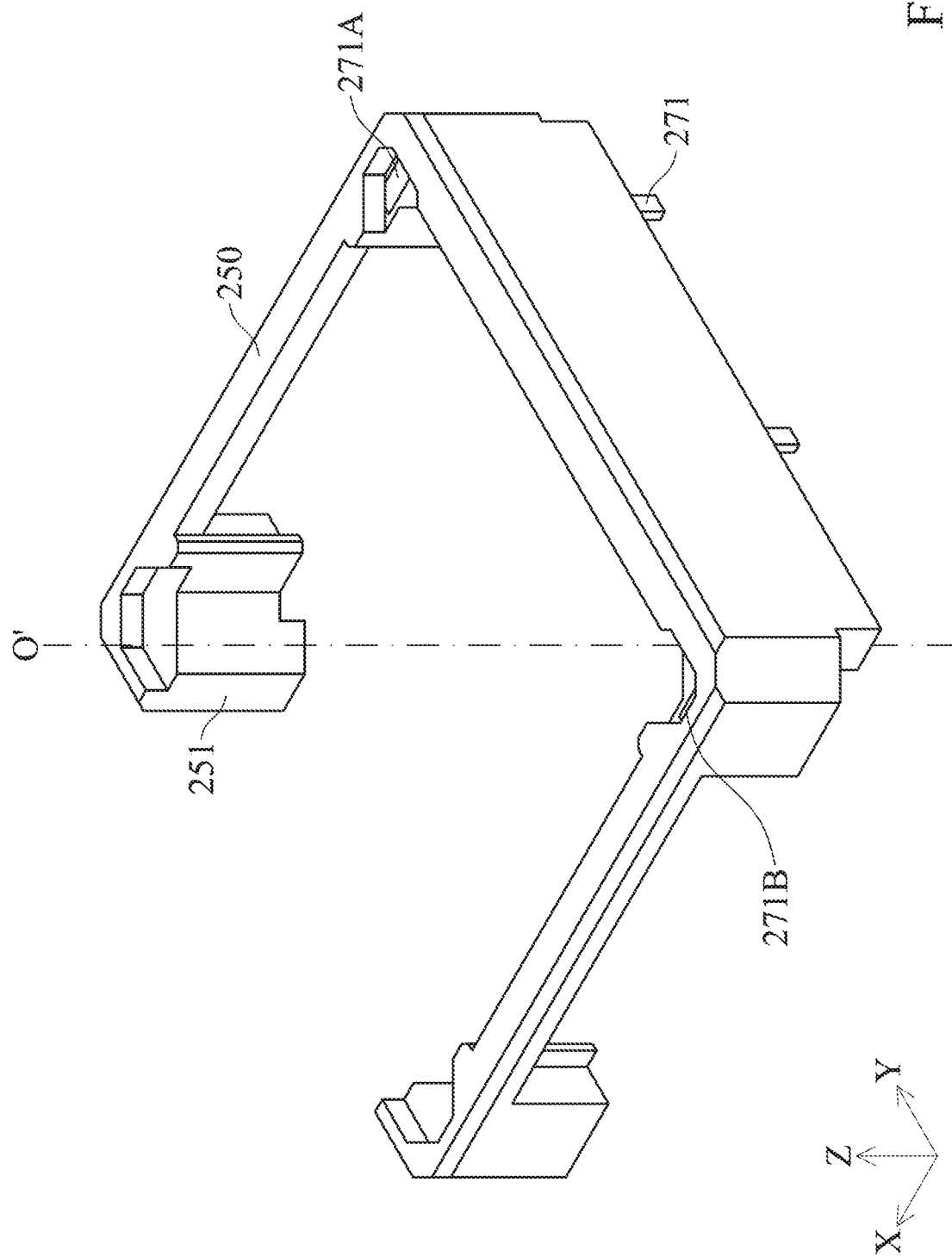
FIG. 20 is a perspective view illustrating a frame and a first circuit assembly in accordance with an embodiment of the present disclosure.

FIG. 20 is a perspective view illustrating the frame 250 and the first circuit assembly 271 in accordance with an embodiment of the present disclosure. In the present embodiment, the frame 250 includes two protruding portions 251 that extend along the optical axis O' towards the base 220. In addition, the first circuit assembly 271 is formed in the frame 250 by insert molding. The first circuit assembly 271 includes a first electrical contact 271A and a second electrical contact 271B, wherein the first electrical contact 271A and the second electrical contact 271B are located on a plane of the frame 250, and the plane is perpendicular to the optical axis O'. The first circuit assembly 271 is electrically connected to the driving coils 241 via the first electrical contact 271A and the second electrical contact 271B. Therefore, the electric signals may be transmitted to the driving coils 241. As shown in FIG. 20, the first circuit assembly 271 has a stereoscopic structure, namely, the first circuit assembly 271 may distribute on a plurality of planes (including X-Y planes, Y-Z planes, and/or X-Z planes).

It should be noted that although the first circuit assembly 271 is formed by insert molding in the present embodiment, however, those skilled in the art may also form the first circuit assembly 271 by laser direct structuring (LDS) or any other suitable method. In other embodiments, the first circuit assembly 271 may be a printed circuit board (PCB) that is disposed on the frame 250.

Figure 21:
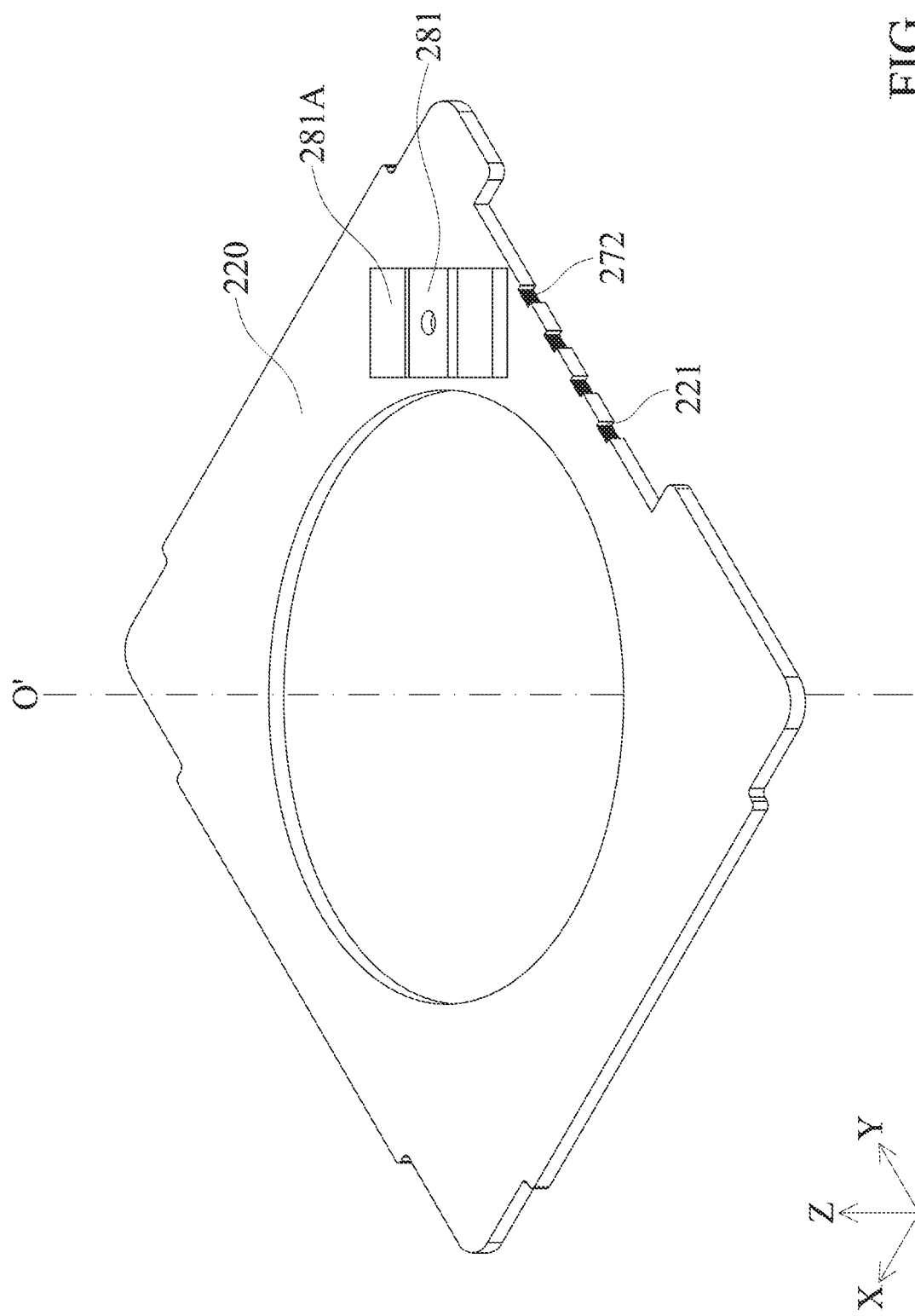
FIG. 21 is a perspective view illustrating a base and a second circuit assembly in accordance with an embodiment of the present disclosure.

FIG. 21 is a perspective view illustrating the base 220 and the second circuit assembly 272 in accordance with an embodiment of the present disclosure. As shown in FIG. 21, the base 220 has a plurality of recesses 221 that are located on a lateral side of the base 220 and extend along the optical axis O'. In the present embodiment, the second circuit assembly 272 is disposed in the recesses 221. The second circuit assembly 272 may be electrically connected to the position sensor 281 and the driving unit that is disposed out of the optical member driving mechanism 1B. Therefore, the electric signals may be transmitted between the position sensor 281 and the driving unit. It should be appreciated that in some embodiments, the base 220 may be made of metallic materials so as to reduce the thickness of the base 220 in Z-axis. Accordingly, in the above embodiments, an insulating layer (not shown) is disposed on the base 220 in order to prevent the short circuit generated due to the direct contact between the base 220 and the second circuit assembly 272.

In some embodiments, the second circuit assembly 272 has a stereoscopic structure, distributing on a plurality of planes. In other words, the second circuit assembly 272 may extend onto an upper surface of the base 220, and/or extend in a direction that is not parallel to the optical axis O'. In some embodiments, as viewed in a direction (X-axis) that is perpendicular to the optical axis O', the first circuit assembly 271 and the second circuit assembly 272 partially overlap.

The position sensor 281 is disposed on the base 220, and detects the position of the reference member 282 that is located in the carrier 230. For example, the position sensor 281 may be a Hall effect sensor, a magnetoresistance (MR) sensor (such as a tunnel magnetoresistance (TMR) sensor), or any other suitable sensor. Yokes 281A are disposed on opposite sides of the position sensor 281. Thanks to the arrangement of the yokes 281A, the magnetic field generated by the reference member 282 may be concentrated, such that the position sensor 281 may detect the position of the optical member more precisely, enhancing the performance of the optical member driving mechanism 1B.

Figure 22:
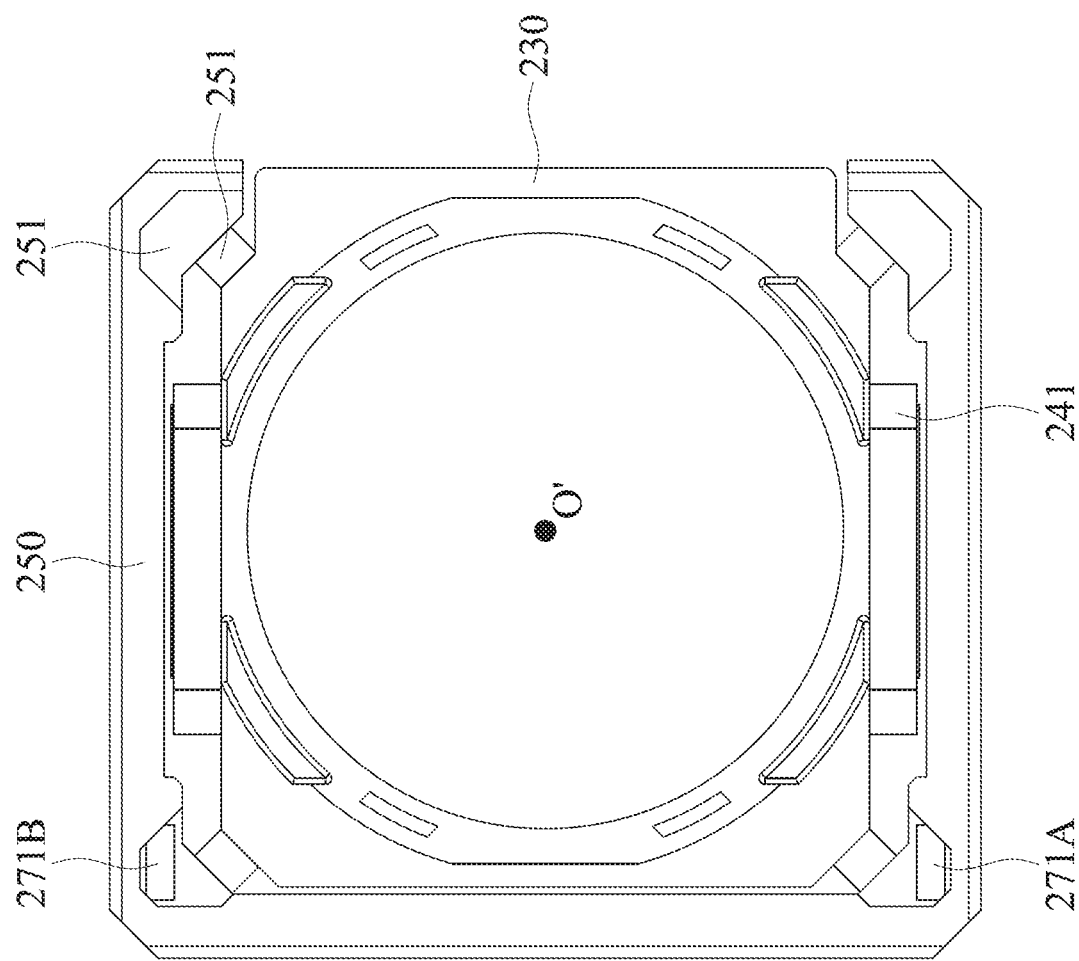
FIG. 22 is top view illustrating an interior structure of the optical member driving mechanism shown in FIG. 17.

FIG. 22 is top view illustrating an interior structure of the optical member driving mechanism 1B shown in FIG. 17. It should be noted that in order to clearly illustrate the position of the damping materials 290, the housing 210 and the elastic member 260 are not shown in the present embodiment. As shown in FIG. 22, the damping materials 290 are disposed between the protruding portions 251 of the frame 250 and the carrier 230. Therefore, resonance effect may be avoided generated in the optical member driving mechanism 1B, and the carrier 230 may be positioned rapidly after arriving the predetermined position, enhancing the efficiency of auto-focusing. It should be appreciated that although four damping materials 290 are disposed in the present embodiment, however, those skilled in the art may adjust the quantity and positions of the damping materials 290 as required, as long as at least one damping material 290 is disposed.

As set forth above, an optical member driving mechanism including a frame and a base, where circuit assemblies are disposed, is provided in the embodiments of the present disclosure. Thanks for arranging the circuit that transmits electric signals respectively on the frame and the base, the circuit inside the optical member driving mechanism may be simplified, and the difficulty of wiring and designing may be reduced. In addition, damping materials are disposed between the protruding portions of the frame and the movable portion so as to avoid resonance effect generated in the optical member driving mechanism. That way, the carrier may also be positioned rapidly after arriving the predetermined position, enhancing the performance of the optical member driving mechanism.

Figure 23:
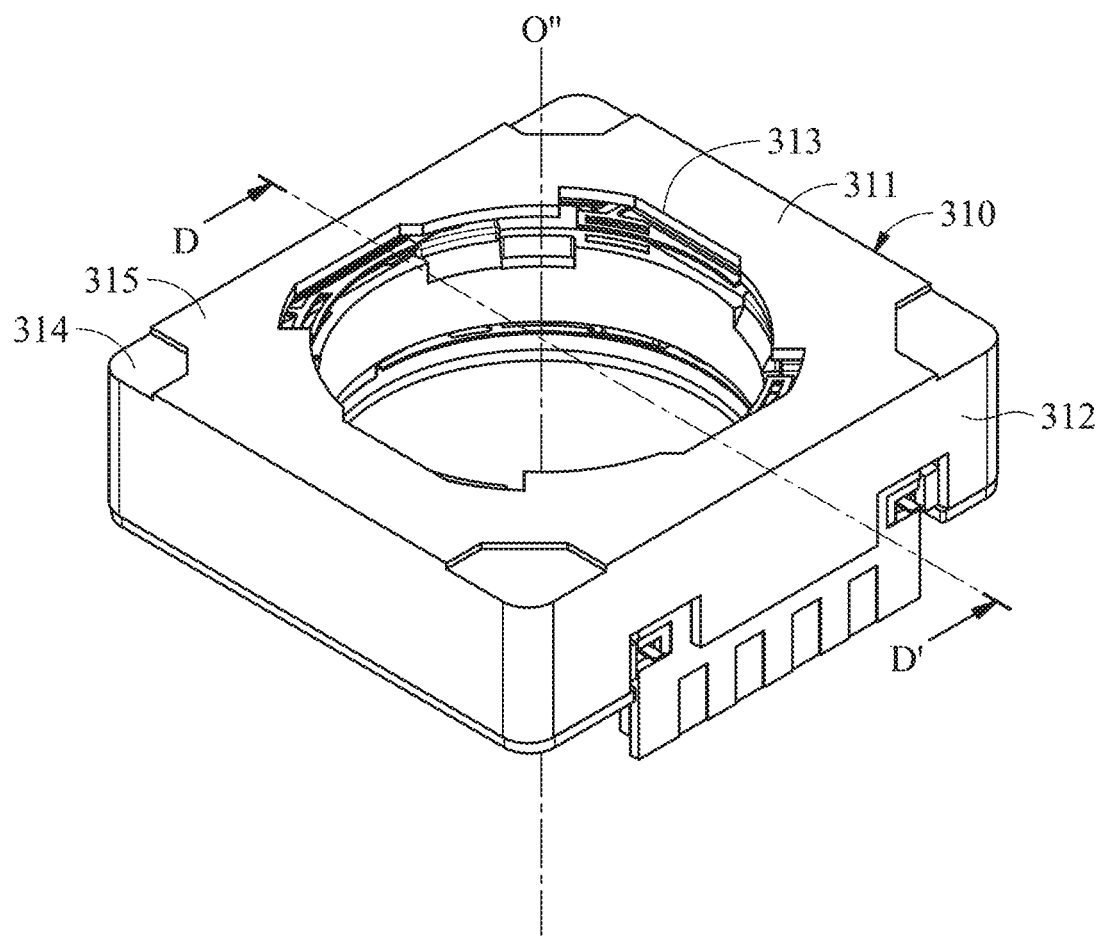
FIG. 23 is a perspective view illustrating an optical member driving mechanism in accordance with an embodiment of the present disclosure.
Figure 23:
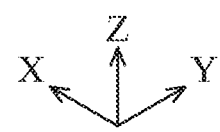

FIG. 23 is a schematic perspective view illustrating an optical member driving mechanism 1C in accordance with an embodiment of the present disclosure. It should be noted that, in this embodiment, the optical member driving mechanism 1C may be, for example, a voice coil motor (VCM), which may be disposed in the electronic devices with camera function for driving an optical member (such as a lens), and can perform an autofocus (AF) function. In addition, the optical member driving mechanism 1C has a substantial rectangular structure, wherein a housing 310 of the optical member driving mechanism 1C has includes a top wall 311 and four sidewalls 312. An opening 313 is formed on the top wall 311 and corresponds to the optical member (not shown). That is, light may pass through the opening 313 via a main axis O" and enter into the optical member driving mechanism 1C.

In addition, the optical member driving mechanism 1C has a first surface 314 and a second surface 315, wherein the first surface 314 is lower than the second surface and located at four corners of the housing 310. In other words, the first surface 314 is closer to a base 320 (shown in FIG. 2) of the optical member driving mechanism 1C than the second surface 315. Thanks to the arrangement the higher second surface 315, the space provided for an elastic member inside the optical member driving mechanism 1C may be increased, enhancing the reliability of the operation of the optical member driving mechanism 1C.

Figure 24:
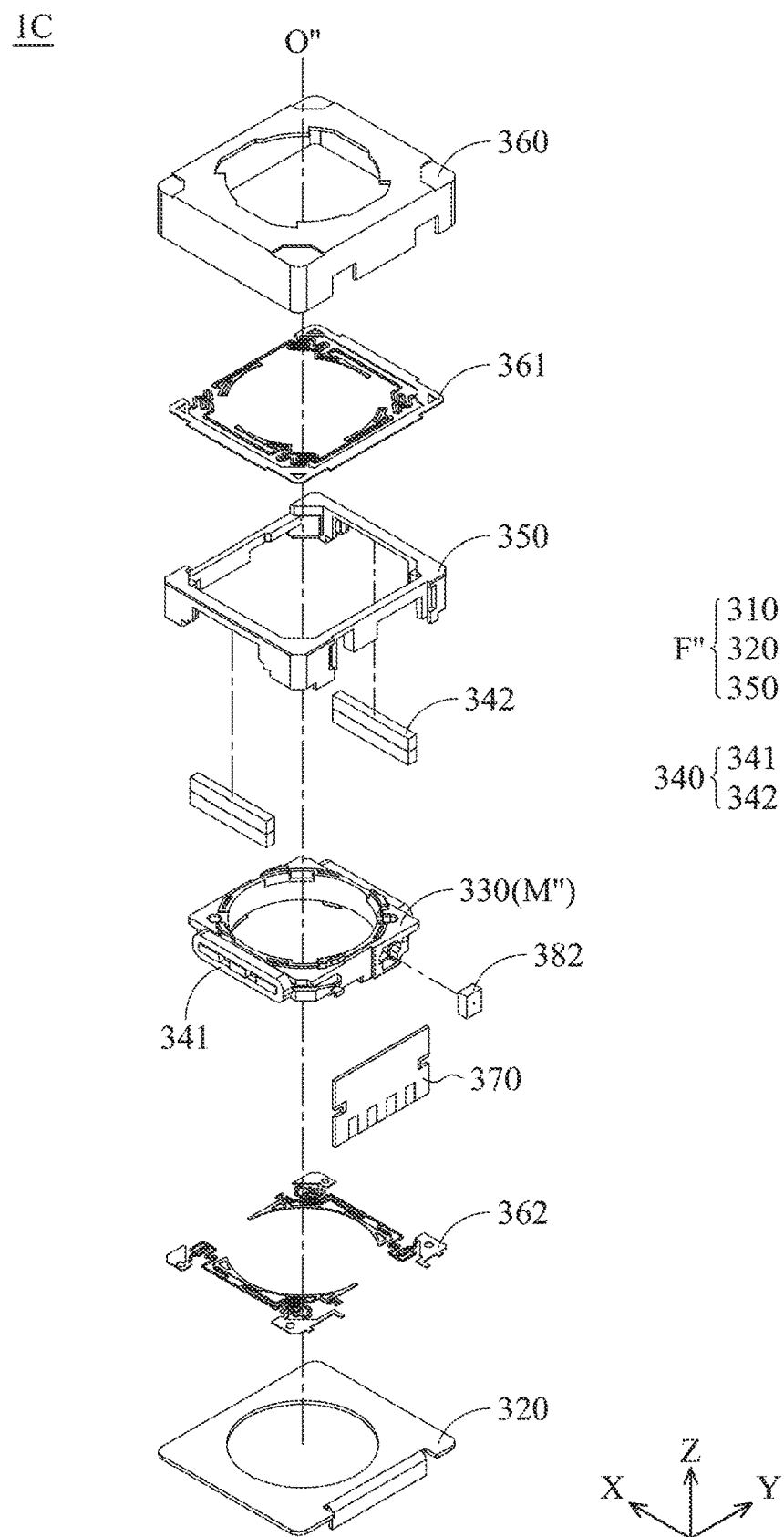
FIG. 24 is an exploded view illustrating the optical member driving mechanism shown in FIG. 23.

FIG. 24 is an exploded view illustrating the optical member driving mechanism 1C shown in FIG. 23. As shown in FIG. 24, the optical member driving mechanism 1C mainly includes a housing 310, a base 320, a carrier 330, a driving assembly 340, a frame 350, a first elastic member 361, a second elastic member 362, a circuit component 370, and a reference member 382. In addition, the housing 310, the base 320, and the frame 350 may constitute a fixed portion F", and the carrier 330 is a movable portion M".

The housing 310 and the base 320 may be assembled as a hollow case. Therefore, the carrier 330, the driving assembly 340, the frame 350, the first elastic member 361, and the second elastic member 362 may be surrounded by the housing 310, and thus may be contained in the case. Accordingly, the housing 310, the frame 350, and the base 320 are sequentially arranged along the main axis O". In other words, the light may sequentially pass through the housing 310, the frame 350, and the base 320 and reach an image device (not shown) disposed out of the optical member driving mechanism 1C, generating an image. In addition, the housing 310 has a first magnetic permeability, the base 320 has a second magnetic permeability, and the first magnetic permeability is different from the second magnetic permeability. In some embodiments, the first magnetic permeability is greater than the second magnetic permeability, but it is not limited thereto.

The carrier 330 has a hollow structure, and carries an optical member with an optical axis, which is parallel to the main axis O". The frame 350 is disposed on the base 320 and affixed to the housing 310. In addition, the carrier 330 is movably connected to the housing 310 and the base 320. The first elastic member 361 is disposed between the housing 310 and the frame 350, and the second elastic member 361 is disposed between the frame 350 and the base 320. To be more specific, the carrier 330 may be connected to the frame 350 via the first elastic member 361 and the second elastic member 362, wherein the first elastic member 361 and the second elastic member 362 are metallic materials. Therefore, the carrier 330 is movably suspended in the frame 350 and moves between the housing 310 and the base 320 along the main axis O".

The driving assembly 340 includes two driving coils 341 and two magnetic members 342. The driving coils 341 are disposed on the carrier 330, and the magnetic members 342 may be disposed on the frame 350. When a current is applied to the driving coils 341, an electromagnetic driving force may be generated by the driving coils 341 and the magnetic members 342 to drive the carrier 330 and the optical member carried therein to move along Z-axis (namely, the main axis O") relative to the base 20. Therefore, the autofocus (AF) function is performed. In other embodiment, the positions of the driving coils 341 and the magnetic members 342 are interchangeable. In other words, the driving coils 341 may be disposed on the frame 350, and the magnetic members 342 may be disposed on the carrier 330. That way, the autofocus (AF) function may also be achieved.

The circuit component 370 is disposed on one side of the frame 350, and extends along the main axis O". In the present embodiment, the circuit component 370 and the magnetic members 342 are located on different sides of the frame 350. In addition, the reference member 382 is disposed in the carrier 330. The reference member 382 and a position sensor 381 (shown in FIG. 25A), which is disposed on the circuit component 370, constitute a position-sensing assembly. Thanks for arranging the position sensor 381 and the reference member 382 on the same side of the frame 350, the position sensor 381 may detect the position of the reference member 382 so as to determine the position of the carrier 330 and the optical member.

Figure 25A:
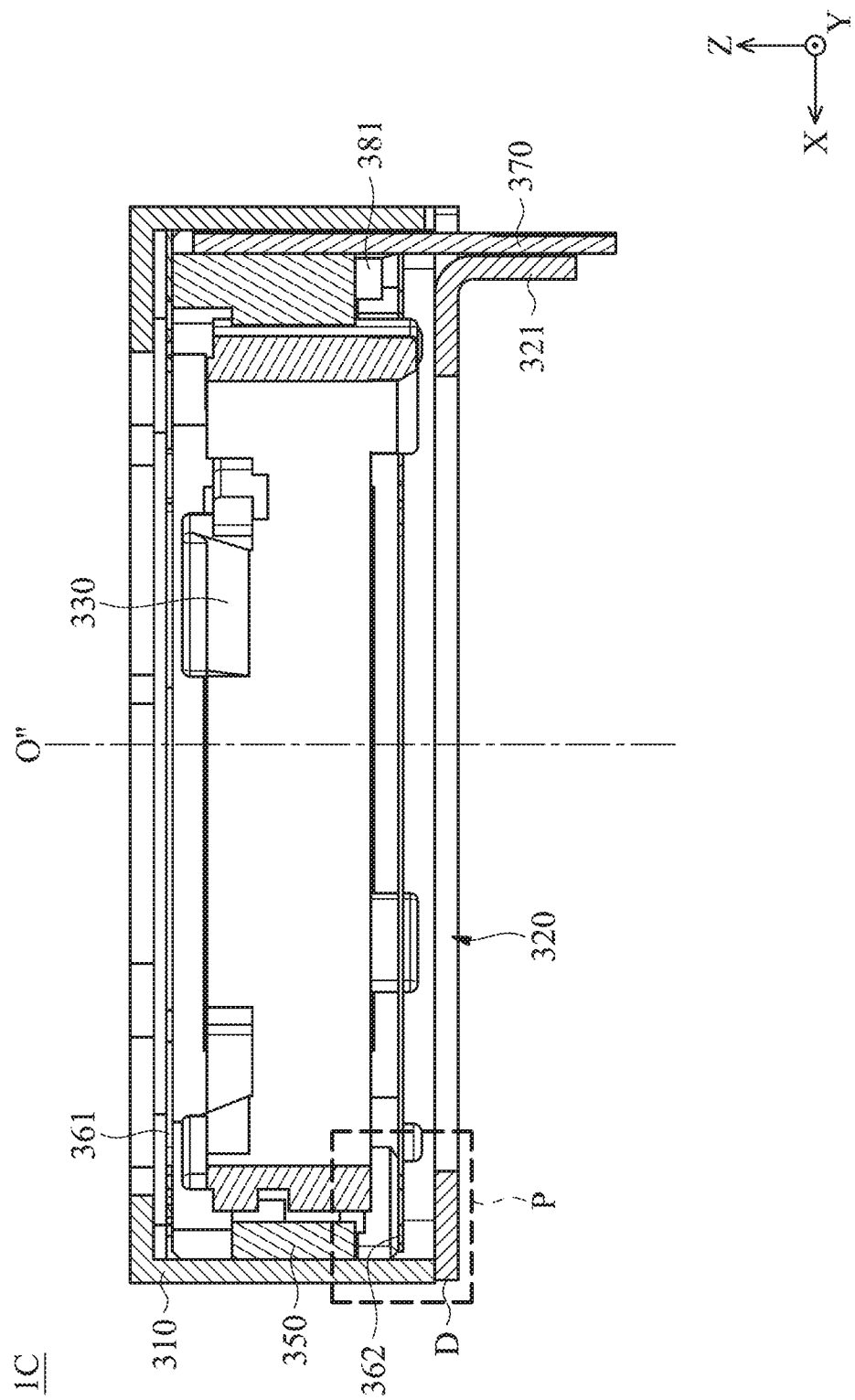
FIG. 25A is a cross-sectional view illustrating along line D-D' shown in FIG. 23.
Figure 25B:
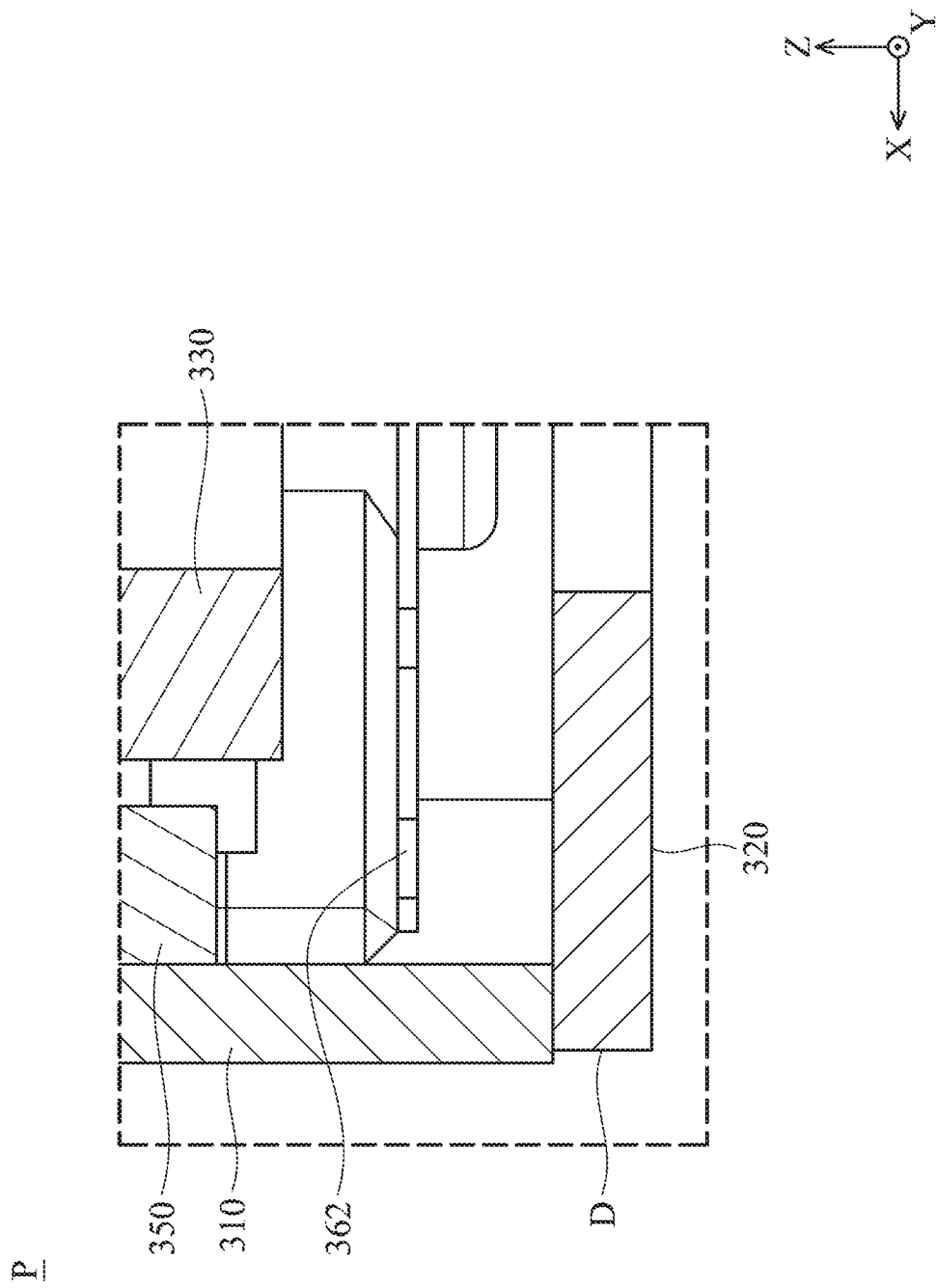
FIG. 25B is an enlarged view illustrating region P shown in FIG. 25A.

FIG. 25A is a cross-sectional view illustrating along line D-D' shown in FIG. 23. As shown in FIG. 25A, the housing 310 and the base 320 are aligned on one side, where the circuit component 370 is disposed, of the frame 350. Therefore, the housing 310 and the base 320 are positioned during the assembly. Rather, the housing 310 and the base 320 are not aligned on another side, where the circuit component 370 is not disposed, of the frame 350. FIG. 25B is an enlarged view illustrating region P shown in FIG. 25A. As shown in FIG. 25B, a step D is formed by the housing 310 and the base 320. A laser sintering process may be performed at the step D in order to combine the housing 310 and the base 320. That way, the bonding force between the housing 310 and the base 320 may be significantly increased, making it difficult for the optical member driving mechanism 1C to disintegrate because of external forces. It should be appreciated that although the step D is only shown in one side of the optical member driving mechanism 1C, however in some embodiments, the step D may be disposed on all sides where the circuit component 370 is not disposed.

In the present embodiment, the housing 310 and the base 320 do not overlap as viewed in a direction perpendicular to the main axis O". Accordingly, the structures of the housing 310 and the base 320 may be simplified, and the overall height of the optical member driving mechanism 1C may be reduced. In addition, the base 320 includes a barrier 321 that extends away from the housing 310 along the main axis O" (Z-axis). The barrier 321 abuts the circuit component 370 in a first direction (X-axis), and the first direction is perpendicular to the main axis O". Thanks to the arrangement of the barrier 321, stable support to the circuit component 370 may be provided, and the structural strength and stability of the optical member driving mechanism 1C may be enhanced. Furthermore, the position sensor 381 is disposed on the circuit component 370. For example, the position sensor 381 may be a Hall effect sensor, a magnetoresistance (MR) sensor, such as a tunnel magnetoresistance (TMR) sensor, or any other sensor that may detect magnetic fields.

Figure 26A:
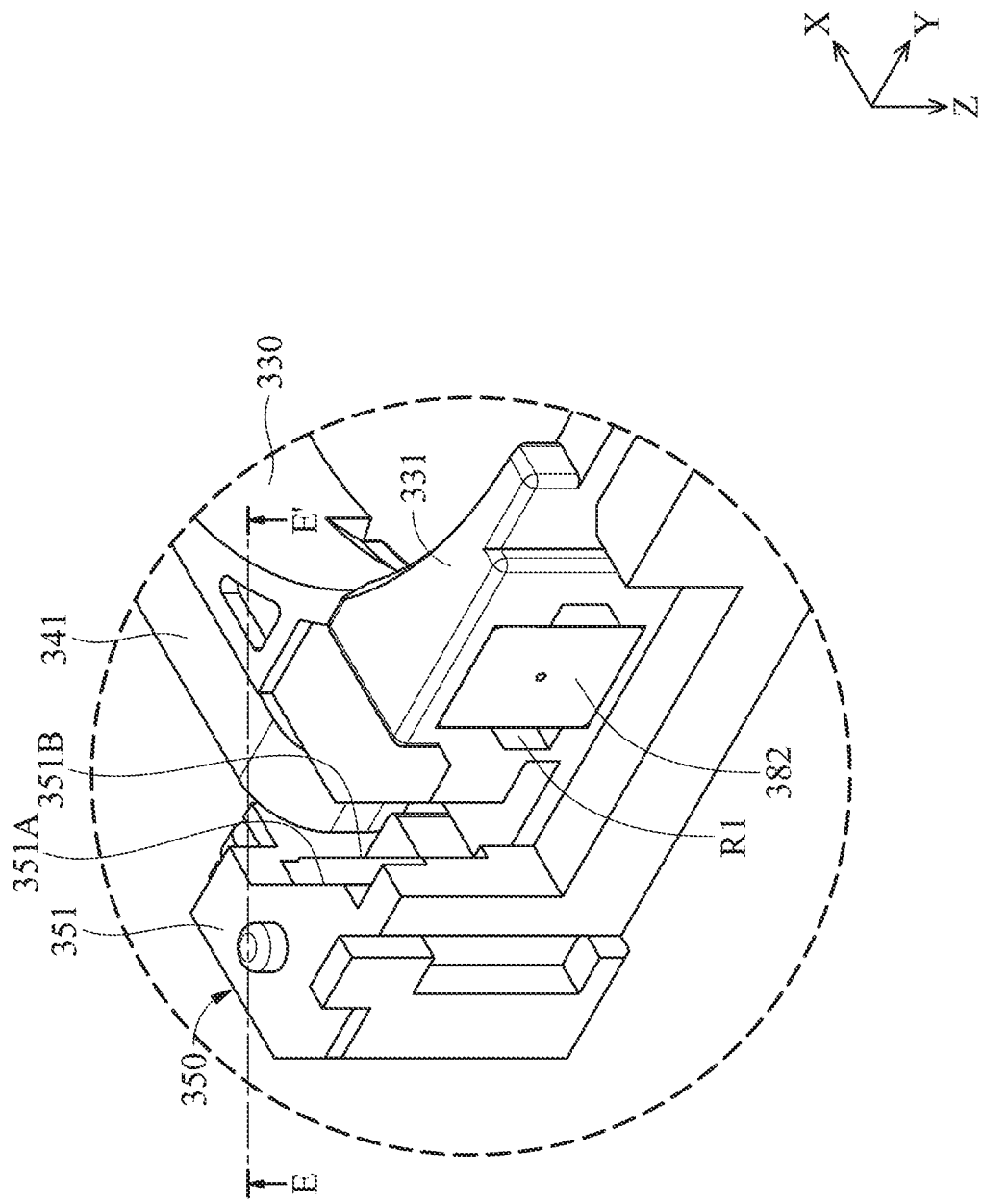
FIG. 26A is a partial perspective view illustrating the interior structure of the optical member driving mechanism in accordance with an embodiment of the present disclosure.

FIG. 26A is a partial perspective view illustrating the interior structure of the optical member driving mechanism 1C in accordance with an embodiment of the present disclosure. It should be noted that in order to clearly illustrate the detailed structure of the frame 350, the housing 310 and the base 320 are omitted in FIG. 26A, and the bottom (the side facing the base 320) of the carrier 330 and the frame 350 are illustrated as the top side. As shown in FIG. 26A, protruding columns 351 are formed at corners of the frame 350 and extend towards the base 320 along the main axis O". In other words, the first surface 314 and the protruding columns 351 may overlap. It should be understood that although only one of the protruding columns 351 of the frame 350 is shown in the present embodiments, however, the same or similar structure may be formed at the other corners of the frame 350, and will not be repeated again.

Figure 26B:
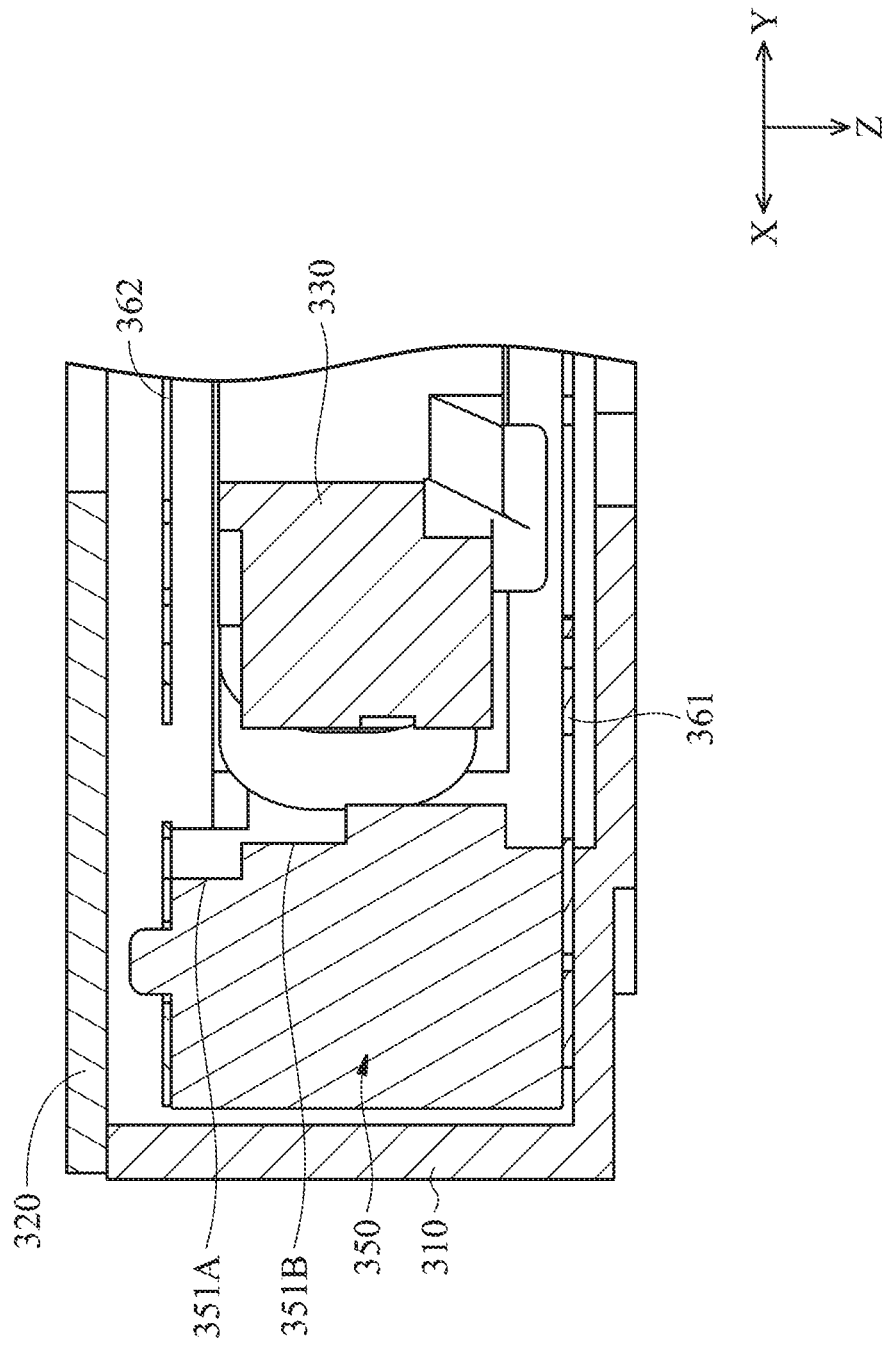
FIG. 26B is a cross-sectional view illustrating along line E-E' shown in FIG. 26A.

FIG. 26B is a cross-sectional view illustrating along line E-E' shown in FIG. 26A. As shown in FIG. 26B, the protruding column 351 has a first section 351A and a second section 351B, wherein the first section 351A is closer to the base 320 than the second section 351B. The shortest distance between the first section 351A and the carrier 330 is longer than the shortest distance between the second section 351B and the carrier 330. Therefore, the protruding column 351 has a tapering structure that extends downwards. Thanks to the arrangement of the tapering structure, making it easier for the assembly of the frame 350 and the carrier 330. In some embodiments, at least one damping material is disposed between the carrier 330 and the protruding column 351, wherein the damping material may be disposed between the carrier 330 and the protruding column 351 from the bottom of the frame 350. Since larger space is formed between the frame 350 and the carrier 330, it is prevented that the damping material flows to an unexpected position due to capillary phenomenon.

In addition, referring back to FIG. 26A, a first recess R1 is formed on a lateral side of the carrier 330, and the reference member 382 is disposed in the first recess R1. An adhesive may be filled into the first recess R1 so as to affix the reference member 382 into the first recess R1. It should be understood that the first recess R1 does not expose from an upper surface and a lower surface of the carrier 330. In other words, a portion of the carrier 330 may be located between the reference member 382 and the housing 310 or the base 320. As a result, the reference member 382 is not attracted by the housing 310 or the base 320, which are made of metallic materials, and move upwards or downwards. Also, the reference member 382 would be avoided damaged due to collisions in Z-axis. The carrier 330 includes a first stopping portion 331 that protrudes towards the base 320. As viewed along the main axis O", the reference member 382 and the first stopping portion 331 overlap. Thanks to the above design, the required space for the carrier 330 may be significantly reduced. The miniaturization of the optical member driving mechanism 1C may be achieved.

Figure 27:
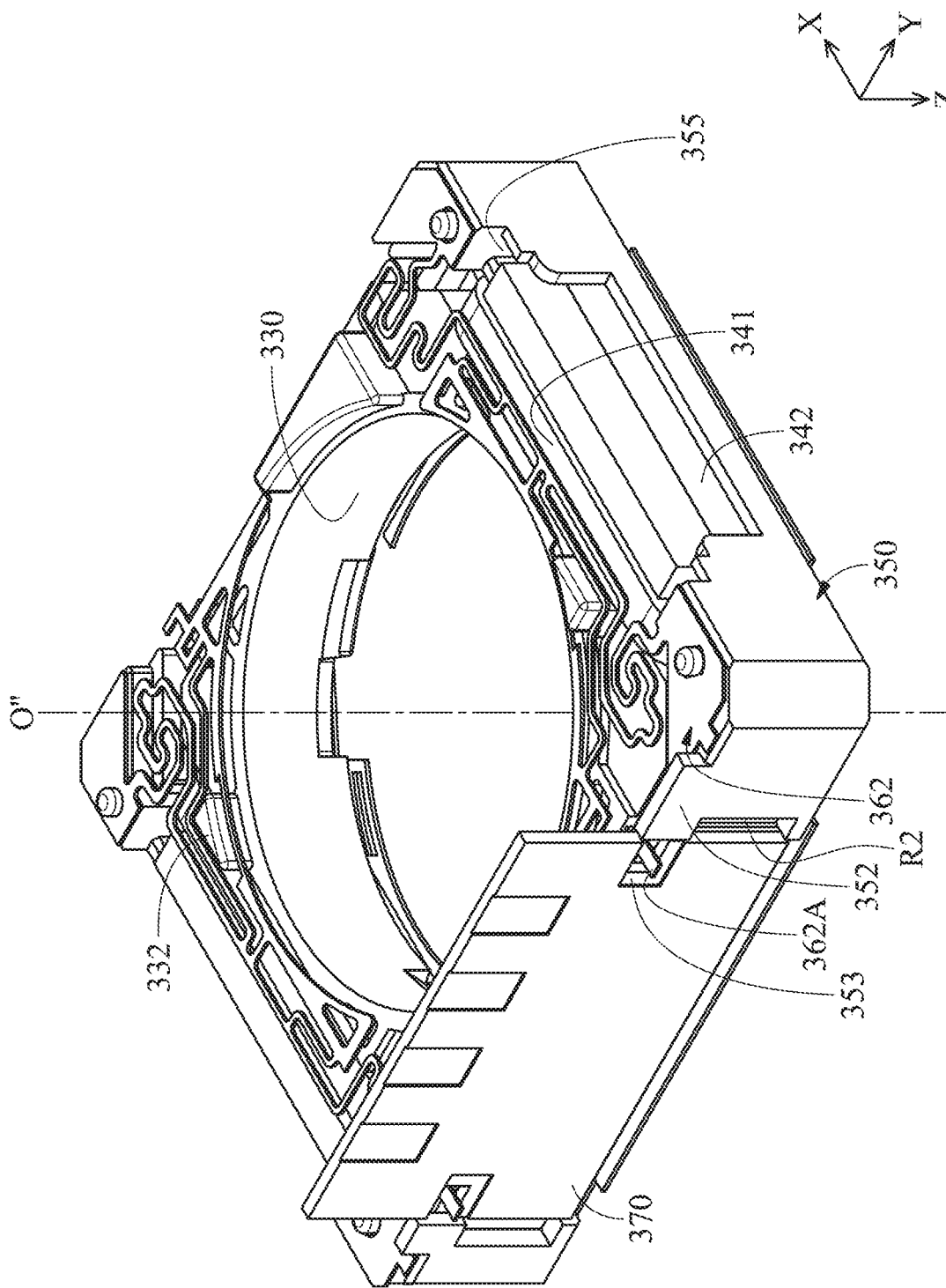
FIG. 27 is a partial perspective view illustrating the interior structure of the optical member driving mechanism shown in FIG. 23.

FIG. 27 is a partial perspective view illustrating the interior structure of the optical member driving mechanism 1C shown in FIG. 23. It should be noted that in order to clearly illustrate the detailed structure of the frame 350, the bottom (the side facing the base 320) of the carrier 330 are illustrated as the top side. As shown in FIG. 27, the frame 350 includes a protruding portion 352, and a hole 353 is formed between the protruding portion 352 and the circuit component 370. The second elastic member 362 includes a first electrical contact 362A that extends into the hole 353 and is electrically connected to the circuit component 370. An adhesive may be filled into the hole 353 so as to affix the second elastic member 362 to the circuit component 370. Thanks to the arrangement of the protruding portion 352, the adhesive may be effectively prevented from overflowing out of the hole 353.

In the present embodiment, the circuit component 370 is disposed on the frame 350, and a second recess R2 is formed between the circuit component 370 and the frame 350. An adhesive may be filled into the second recess R2 so as to affix the circuit component 370 to the frame 350. The frame 350 further includes a positioning portion 354, wherein the magnetic member 342 is disposed in the frame 350, and the positioning portion 354 is located between the magnetic member 342 and the housing 310. Thanks to the arrangement of the positioning portion 354, when the magnetic member 342 is disposed in the frame 350, whether the magnetic member 342 reaches correct position may be effectively determined, which facilitates the assembly. In addition, after the magnetic member 342 is disposed in the frame 350, grooves 355 are each disposed on opposite sides of the magnetic member 342. An adhesive may be filled into the grooves 355 so as to affix the magnetic member 342 to the frame 350.

Furthermore, the carrier 330 includes a second stopping portion 332 that protrudes towards the base 320. The distance between the second stopping portion 332 and the base 320 is shorter than the distance between the second elastic member 362 and the base 320. As a result, the probability that the second elastic member 362 directly collides with the base 320 may be reduced, such that short circuit may be avoided, or the second elastic member 362 is prevented from damaged.

Figure 28A:
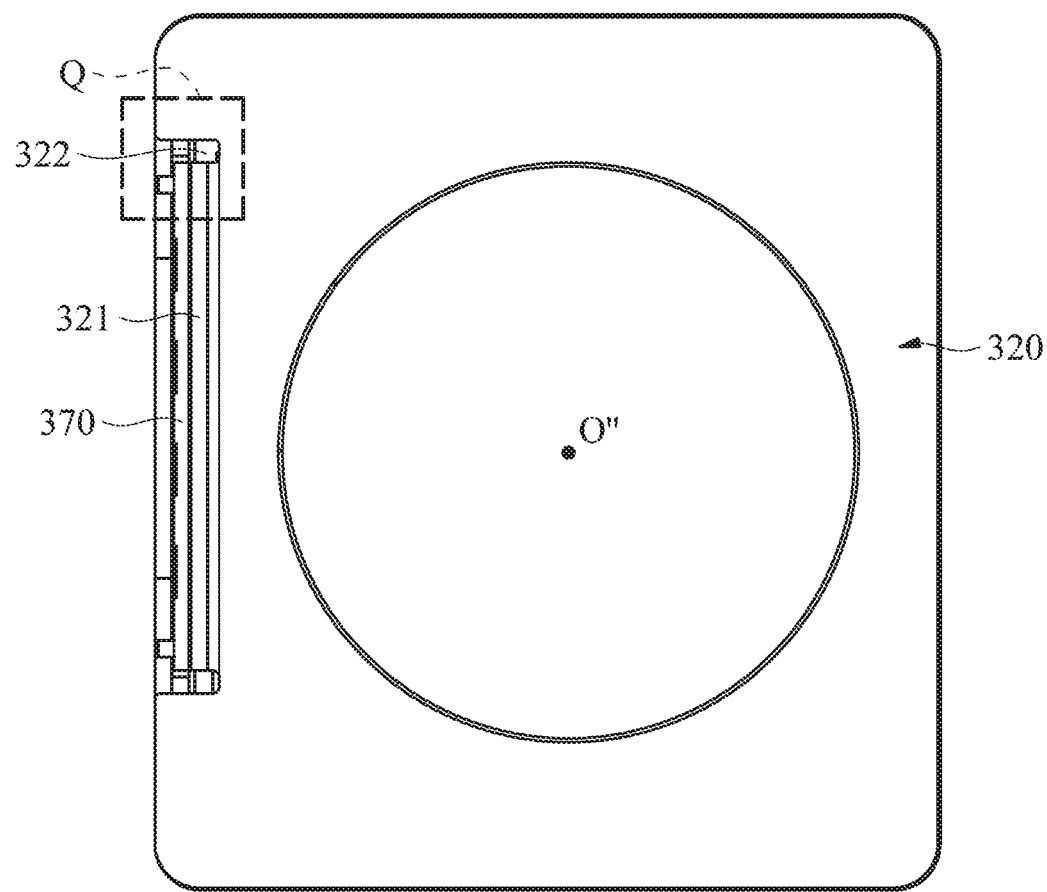
FIG. 28A is a bottom view illustrating the optical member driving mechanism in accordance with an embodiment of the present disclosure.
Figure 28A:
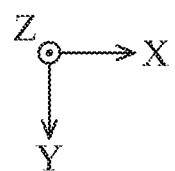
Figure 28B:
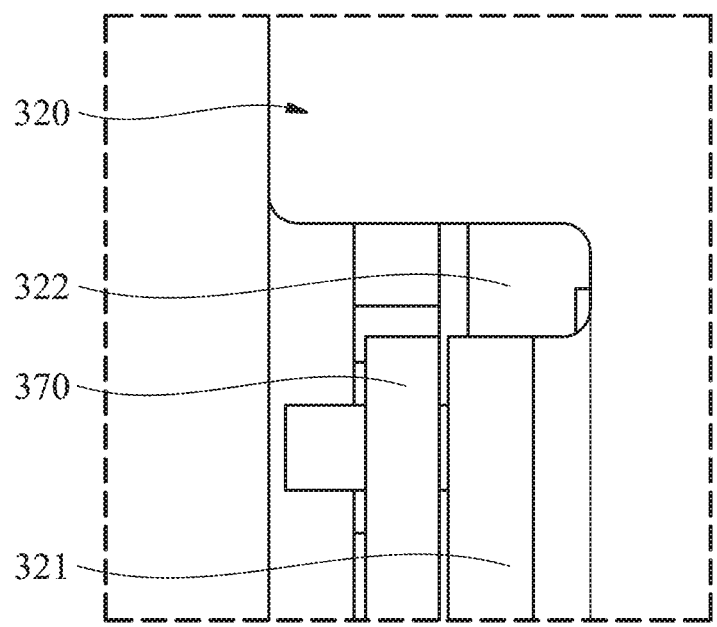
FIG. 28B is an enlarged view illustrating region Q shown in FIG. 28A.

FIG. 28A is a bottom view illustrating the optical member driving mechanism 1C in accordance with an embodiment of the present disclosure, and FIG. 28B is an enlarged view illustrating region Q shown in FIG. 28A. As shown in FIGS. 28A and 28B, a gap 322 is formed between the barrier 321 and the base 320 along a second direction (Y-axis), and the second direction is perpendicular to the main axis O" (Z-axis) and the first direction (X-axis). Thanks to the arrangement of the gap 322, when the barrier 321 is formed, the probability that burrs are generated on the barrier 321 and the base 320 may be reduced, and the manufacturing yield of the optical member driving mechanism 1C is increased.

Figure 29:
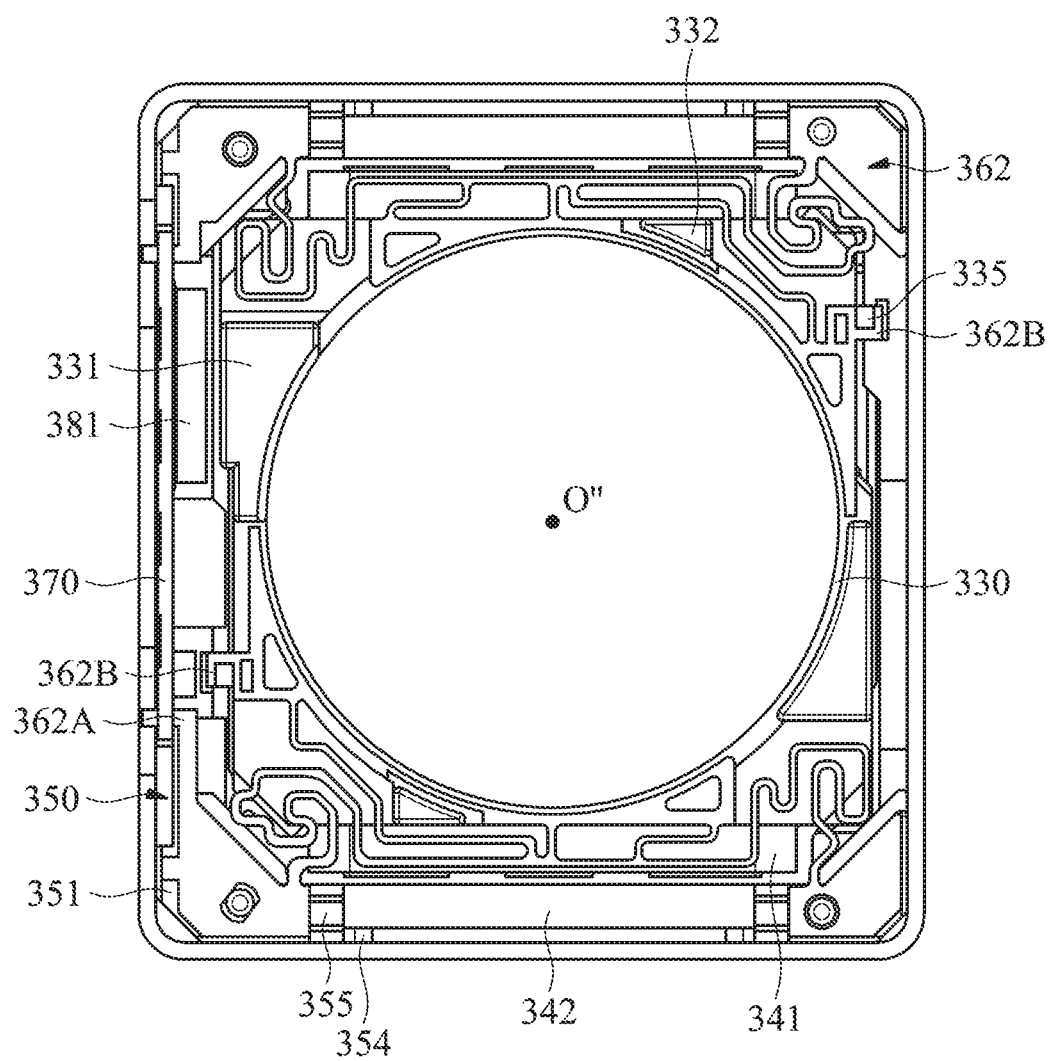
FIG. 29 is a bottom view illustrating the interior structure of the optical member driving mechanism in accordance with an embodiment of the present disclosure.

FIG. 29 is a bottom view illustrating the interior structure of the optical member driving mechanism 1C in accordance with an embodiment of the present disclosure. As shown in FIG. 29, the grooves 355 are formed between the frame 350 and the magnetic member 342 and located on a connecting line of two adjacent protruding columns 351, wherein the connecting line is parallel to X-axis or Y-axis. The second elastic member 362 further includes a plurality of second electrical contacts 362B, and extending directions of the second electrical contacts 362B are different. As viewed along the main axis O", the second electrical contacts 362B and wiring columns 335 of the carrier 330 overlap, and the second electrical contacts 362B are electrically connected to the driving coils 341 via the wiring columns 335. Accordingly, electric signals may be transmitted between the circuit component 370 and the driving coils 341 via the second elastic member 362. In the present embodiment, the extending direction (such as parallel to X-axis) of the first electrical contact 362A is not parallel to the extending direction (such as parallel to Y-axis) of the second electrical contact 362B.

Figure 30:
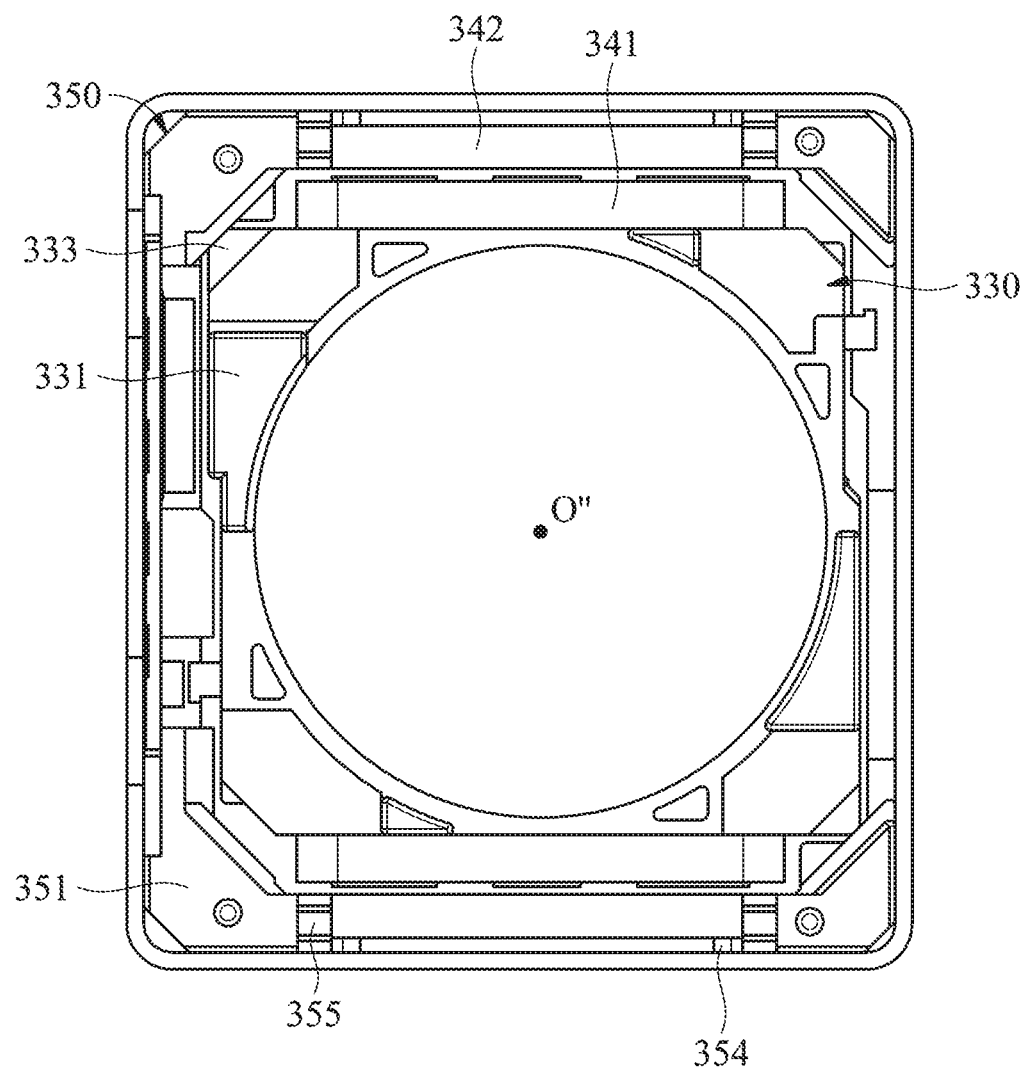
FIG. 30 is a bottom view illustrating the frame and the carrier shown in FIG. 29.

FIG. 30 is a bottom view illustrating the frame 350 and the carrier 330 shown in FIG. 29. The carrier 330 further includes at least one side stopping portion 333 that is located at a corner of the carrier 330. The side stopping portion 333 faces the frame 350 in a direction that is perpendicular to the main axis O" (namely, parallel to the X-Y plane). For example, the side stopping portion 333 may be an L-shaped structure, and the frame 350 also has a structure that corresponds to the side stopping portion 333. As a result, the spacing between the frame 350 and the side stopping portion 333 is substantially uniform. Thanks to the arrangement of the side stopping portion 333, the carrier 330 may be effectively prevented from rotating around the main axis O" relative to the frame 350. In addition, the frame 350 and the carrier 330 partially overlap as viewed along the main axis O". To be more specific, the frame 350 may overlap with the side stopping portion 333 and the wiring column 335.

Figure 31:
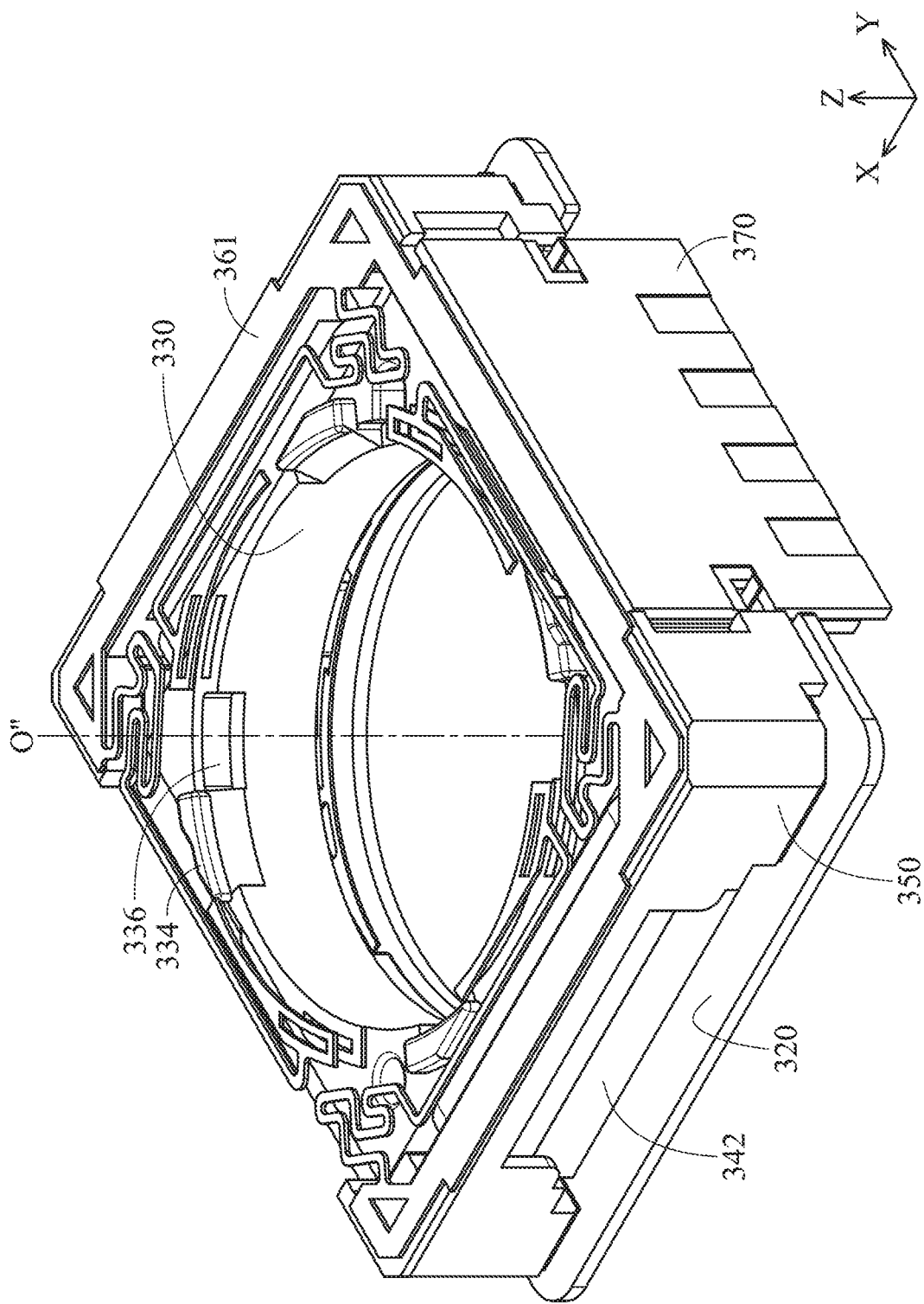
FIG. 31 is a perspective view illustrating the interior structure of the optical member driving mechanism in accordance with an embodiment of the present disclosure.

FIG. 31 is a perspective view illustrating the interior structure of the optical member driving mechanism 1C in accordance with an embodiment of the present disclosure. As shown in FIG. 31, the carrier 330 further includes an upper stopping portion 334 and an adhesive groove 336, wherein the upper stopping portion 334 protrudes towards the housing 310 along the main axis O", and the adhesive groove 336 is disposed inside the carrier 330 and adjacent to the upper stopping portion 334. In some embodiments, in the manufacturing process of the optical member driving mechanism 1C, the upper stopping portion 334 and the adhesive groove 336 may be configured for positioning the fixture. In addition, when the optical member is mounted onto the carrier 330, an adhesive may be filled into the adhesive groove 336 so as to affix the optical member to the carrier 330.

As set forth above, the embodiments of the present disclosure provides an optical member driving mechanism including a frame and a movable portion, wherein the frame includes a protruding column, and the distance between the protruding column and the movable portion is increasing towards the base. By means of designing the protruding column as a downward tapering structure, a damping material may be disposed between the frame and the movable portion from the bottom. As a result, the movable portion may reach the predetermined position more rapidly, and the performance of the optical member driving mechanism may be enhanced. In addition, the housing and the base are combined by a laser sintering process. The structural strength of the optical member driving mechanism may also be enhanced.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
   a fixed portion, comprising:
     a housing comprising a top wall and a plurality of sidewalls, wherein a first containing space is formed by the sidewalls and the top wall;
     a frame, disposed in the first containing space, having a second containing space;
     a circuit component disposed in the frame; and
     a base connected to the housing;
   a movable portion, movably connected to the fixed portion, carrying an optical member, wherein the top wall is perpendicular to an optical axis of the optical member, and the sidewalls extend from the top wall along the optical axis;
   a driving assembly driving the movable portion to move relative to the fixed portion, wherein the driving assembly is electrically connected to the circuit component, and the driving assembly is partially disposed in the second containing space;
   a first elastic member elastically connected to the movable portion and the fixed portion, wherein the frame further comprises a first surface and a second surface, the first surface and the second surface face the top wall, a distance between the first surface and the top wall is shorter than a distance between the second surface and the top wall, and the first elastic member is disposed on the second surface; and
   a second elastic member elastically connected to the movable portion and the fixed portion, wherein the frame further comprises a third surface facing the base, and the second elastic member is disposed on the third surface,
   wherein the circuit component is partially exposed from the third surface and is electrically connected to the second elastic member, and the driving assembly is electrically connected to the circuit component via the second elastic member.

2. The optical member driving mechanism as claimed in claim 1, wherein the housing further comprises an insulating structure disposed on a surface of the housing, and the surface faces the frame.

3. The optical member driving mechanism as claimed in claim 1, wherein the frame further comprises a plurality of protruding portions, and the second containing space is located between the protruding portions.

4. The optical member driving mechanism as claimed in claim 1, further comprising a position-sensing assembly comprising a reference member and a position sensor, wherein the frame is partially located between the reference member and the position sensor.

5. The optical member driving mechanism as claimed in claim 1, wherein the frame is substantially C-shaped and forms an opening, the frame further comprises three rims, and the second containing space is formed by the rims.

6. The optical member driving mechanism as claimed in claim 5, wherein the movable portion further comprises a positioning portion, the movable portion is disposed in the second containing space, and the positioning portion is located in the opening of the frame.

7. An optical member driving mechanism, comprising:
   a fixed portion, comprising:
     a housing comprising a top wall and a plurality of sidewalls, wherein a first containing space is formed by the sidewalls and the top wall;
     a frame, disposed in the first containing space, having a second containing space;
     a circuit component disposed in the frame; and
     a base connected to the housing;
   a movable portion, movably connected to the fixed portion, carrying an optical member, wherein the top wall is perpendicular to an optical axis of the optical member, and the sidewalls extend from the top wall along the optical axis; and
   a driving assembly driving the movable portion to move relative to the fixed portion, wherein the driving assembly is electrically connected to the circuit component, and the driving assembly is partially disposed in the second containing space, wherein the optical axis is offset from a geometry center of the housing.

8. An optical member driving mechanism, comprising:
   a fixed portion, comprising:
     a housing comprising a top wall and a plurality of sidewalls, wherein a first containing space is formed by the sidewalls and the top wall;
     a frame, disposed in the first containing space, having a second containing space;
     a circuit component disposed in the frame; and
     a base connected to the housing;
   a movable portion, movably connected to the fixed portion, carrying an optical member, wherein the top wall is perpendicular to an optical axis of the optical member, and the sidewalls extend from the top wall along the optical axis; and
   a driving assembly driving the movable portion to move relative to the fixed portion, wherein the driving assembly is electrically connected to the circuit component, and the driving assembly is partially disposed in the second containing space, wherein the housing further comprises a plurality of bonding portions disposed on a bottom surface of the housing, the base further comprises a plurality of recesses around the base, and when the housing and the base are bonded together, the bonding portions each are bonded to the recesses.

9. An optical member driving mechanism, comprising:
a fixed portion, comprising:
- a housing comprising a top wall and a plurality of sidewalls, wherein a first containing space is formed by the sidewalls and the top wall;
- a frame, disposed in the first containing space;
- a circuit component disposed in the frame; and
- a base fixedly connected to the housing;

a movable portion, movably connected to the fixed portion, carrying an optical member with an optical axis, wherein the top wall is perpendicular to the optical axis, the sidewalls extend from the top wall along the optical axis, and the circuit component extends along the optical axis;

a first elastic member, disposed on the frame, electrically connected to the circuit component, wherein the first elastic member has a plate structure, and a thickness direction of the first elastic member is parallel to the optical axis; and a driving assembly, driving the movable portion to move relative to the fixed portion, electrically connected to the circuit component, wherein the frame further comprises a plurality of positioning structures abutting the driving assembly, and the driving assembly is located between the positioning structure and the housing.

10. The optical member driving mechanism as claimed in claim 9, further comprising a second elastic member located between the housing and the frame, wherein a size of the frame is greater than or equal to a size of the second elastic member as viewed in a direction that is perpendicular to the optical axis.

11. The optical member driving mechanism as claimed in claim 10, wherein as viewed in the optical axis, two sides of the frame at least partially overlap with the second elastic member, and the sides are opposite sides of the frame.

12. The optical member driving mechanism as claimed in claim 9, wherein the movable portion further comprises a plurality of stopping portions protruding from the movable portion towards the base, the stopping portions comprises a first stopping portion and a second stopping portion, a size of the first stopping portion is greater than a size of the second stopping portion, and a distance between the first stopping portion and the base is shorter than a distance between the second stopping portion and the base.

13. The optical member driving mechanism as claimed in claim 9, further comprising a second elastic member located between the housing and the frame, wherein the frame further comprises a plurality of positioning columns, the second elastic member is connected to the frame via the positioning columns, the housing has a plurality of holes, and the positioning columns each are disposed in the holes.

14. The optical member driving mechanism as claimed in claim 9, further comprising a second elastic member located between the housing and the frame, wherein as viewed along the optical axis, the second elastic member and the driving assembly at least partially overlap on one side of the frame, the frame further comprises a protruding portion located on another side of the frame, and the top surface of the protruding portion is level with the top surface of the second elastic member.

15. The optical member driving mechanism as claimed in claim 9, wherein the frame further comprises a protruding column and a hole located on a surface of the frame, the surface faces the base, and the first elastic member is connected to the frame via the protruding column and the hole.

16. The optical member driving mechanism as claimed in claim 9, wherein the driving assembly further comprises two driving coils and a connecting wire connected to the driving coils, the connecting wire and the circuit component at least partially overlap as viewed in a direction that is perpendicular to the optical axis, and the connecting wire and the circuit component are located on opposite sides of the movable portion.

* * * * *